US006658157B1

(12) United States Patent
Satoh et al.

(10) Patent No.: US 6,658,157 B1
(45) Date of Patent: Dec. 2, 2003

(54) METHOD AND APPARATUS FOR CONVERTING IMAGE INFORMATION

(75) Inventors: Kazushi Satoh, Kanagawa (JP); Takeshi Kubozono, Kanagawa (JP); Shintaro Okada, Tokyo (JP); Yu Liu, Tokyo (JP); Naofumi Yanagihara, Tokyo (JP)

(73) Assignee: Sony Corporation, Tokyo (JP)

( * ) Notice: Subject to any disclaimer, the term of this patent is extended or adjusted under 35 U.S.C. 154(b) by 571 days.

(21) Appl. No.: 09/605,035

(22) Filed: Jun. 27, 2000

(30) Foreign Application Priority Data

Jun. 29, 1999  (JP) .......................................... 11-183602

(51) Int. Cl.⁷ ................................................ G06K 9/36
(52) U.S. Cl. ..................................................... 382/239
(58) Field of Search ................................ 382/232, 236, 382/238, 239, 240, 242, 248, 250; 358/432, 433; 348/384.1, 394.1–395.1, 400.1–404.1, 407.1–416.1, 420.1–421.1, 425.2, 430.1–431.1; 375/240.02–240.03, 240.11–240.16, 240.18–240.2, 240.22–240.25; 341/51, 63, 65, 67, 79, 107; 708/203, 300, 307–308, 313, 316–317, 400–405

(56) References Cited

U.S. PATENT DOCUMENTS

| | | | | |
|---|---|---|---|---|
| 4,591,909 A | * | 5/1986 | Kuroda et al. | ......... 375/240.12 |
| 5,394,249 A | * | 2/1995 | Shimoda et al. | ............. 386/124 |
| 5,543,845 A | * | 8/1996 | Asamura et al. | ....... 375/240.02 |
| 6,438,167 B1 | * | 8/2002 | Shimizu et al. | ........ 375/240.03 |

FOREIGN PATENT DOCUMENTS

JP         8-298464         11/1996

* cited by examiner

*Primary Examiner*—Jose L. Couso
(74) *Attorney, Agent, or Firm*—Frommer Lawrence & Haug LLP; William S. Frommer

(57) ABSTRACT

A technique is disclosed for reducing the bit rate of a bit stream coded into a compressed form according to the MPEG-2 standard, without causing significant degradation in image quality of a decoded image. An inverse DCT converter dequantizes a MPEG-2 bit stream and outputs resultant discrete cosine transform coefficients for each DCT block. A band limiter replaces the values of high-frequency components of the discrete cosine transform coefficients in the horizontal direction, with 0. A quantizer quantizes the discrete cosine transform coefficients using a quantization step value different from the original value.

19 Claims, 37 Drawing Sheets

FIG. 6A

| 0  | 1  | 5  | 6  | 14 | 15 | 27 | 28 |
|----|----|----|----|----|----|----|----|
| 2  | 4  | 7  | 13 | 16 | 26 | 29 | 42 |
| 3  | 8  | 12 | 17 | 25 | 30 | 41 | 43 |
| 9  | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG. 6B

| 0  | 4  | 6  | 20 | 22 | 36 | 38 | 52 |
|----|----|----|----|----|----|----|----|
| 1  | 5  | 7  | 21 | 23 | 37 | 39 | 53 |
| 2  | 8  | 19 | 24 | 34 | 40 | 50 | 54 |
| 3  | 9  | 18 | 25 | 35 | 41 | 51 | 55 |
| 10 | 17 | 26 | 30 | 42 | 46 | 56 | 60 |
| 11 | 16 | 27 | 31 | 43 | 47 | 57 | 61 |
| 12 | 15 | 28 | 32 | 44 | 48 | 58 | 62 |
| 13 | 14 | 29 | 33 | 45 | 49 | 59 | 63 |

FIG. 7

| INTRA DC PRECISION (Intra dc precision) | NUMBER OF BITS | INVERSE DCT COEFFICIENT (Intra dc mult) |
|---|---|---|
| 0 | 8 | 8 |
| 1 | 9 | 4 |
| 2 | 10 | 2 |
| 3 | 11 | 1 |

FIG. 8A

| | | | | | | | |
|---|---|---|---|---|---|---|---|
| 8  | 16 | 19 | 22 | 26 | 27 | 29 | 34 |
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

FIG. 8B

| | | | | | | | |
|---|---|---|---|---|---|---|---|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

FIG. 9

| quantiser_scale_code | q_scale_type | |
|---|---|---|
| | 0 | 1 |
| 0 | Forbidden | |
| 1 | 2 | 1 |
| 2 | 4 | 2 |
| 3 | 6 | 3 |
| 4 | 8 | 4 |
| 5 | 10 | 5 |
| 6 | 12 | 6 |
| 7 | 14 | 7 |
| 8 | 16 | 8 |
| 9 | 18 | 10 |
| 10 | 20 | 12 |
| 11 | 22 | 14 |
| 12 | 24 | 16 |
| 13 | 26 | 18 |
| 14 | 28 | 20 |
| 15 | 30 | 22 |
| 16 | 32 | 24 |
| 17 | 34 | 28 |
| 18 | 36 | 32 |
| 19 | 38 | 36 |
| 20 | 40 | 40 |
| 21 | 42 | 44 |
| 22 | 44 | 48 |
| 23 | 46 | 52 |
| 24 | 48 | 56 |
| 25 | 50 | 64 |
| 26 | 52 | 72 |
| 27 | 54 | 80 |
| 28 | 56 | 88 |
| 29 | 58 | 96 |
| 30 | 60 | 104 |
| 31 | 62 | 112 |

FIG. 13

| CODE NAME | CODE VALUE (IN HEXADECIMAL) |
|---|---|
| picture_start_code | 0×000001 00 |
| slice_start_code | 0×000001 01-AF |
| user_data_start_code | 0×000001 B2 |
| sequence_header_code | 0×000001 B3 |
| sequence_error_code | 0×000001 B4 |
| extension_start_code | 0×000001 B5 |
| extension_end_code | 0×000001 B7 |
| group_start_code | 0×000001 B8 |

FIG. 15

| CODE NAME | NUMBER OF BITS | DESCRIPTION |
|---|---|---|
| sequence_header_code | 32 | SEQUENCE HEADER CODE |
| horizontal_size_value | 12 | NUMBER OF PIXELS IN THE HORIZONTAL DIRECITON (LOWER ORDER 12 BITS) |
| vertical_size_value | 12 | NUMBER OF PIXELS IN THE VERTICAL DIRECITON (LOWER ORDER 12 BITS) |
| aspect_ratio_information | 4 | ASPECT RATIO INFORMATION |
| frame_rate_code | 4 | FRAME RATE CODE |
| bit_rate_value | 18 | BIT RATE (LOWER ORDER 18 BITS) (IN UNITS OF 400 BITS) |
| vbv_buffer_size_value | 10 | VBV BUFFER SIZE (LOWER ORDER 10 BITS) |
| intra_quantiser_matrix[64] | 8*64 | INTRA MACRO BLOCK QUANTIZATION MATRIX |
| non_intra_quantiser_matrix[64] | 8*64 | INTRA MACRO BLOCK QUANTIZATION MATRIX |

FIG. 16

| CODE NEME | NUMBER OF BITS | DESCRIPTION |
|---|---|---|
| profile_and_level_indication | 8 | PROFILE, LEVEL |
| progressive_sequence | 1 | PROGRESSIVE SCANNING PICTURE FLAG FOR THE ENTIRETY OF SEQUENCE |
| chroma_format | 2 | CHROMA FORMAT |
| low_delay | 1 | LOW DELAY MODE (NO B-PICTURE) |

FIG. 17

| CODE NAME | NUMBER OF BITS | DESCRIPTION |
|---|---|---|
| extension_data(1) | | EXTENSION DATA(1) |
| sequence_display_extension() | | SEQUENCE DISPLAY () |
| sequence_scalable_extension() | | SEQUENCE SCALABLE EXTENSION() |
| extension_start_code_identifier | 4 | SEQUENCE SCALABLE EXTENSION ID |
| scalable_mode | 2 | SCALABILITY MODE |
| layer_id | 4 | SCALABLE LAYER ID |
| SPATIAL SCALABILITY MODE: | | |
| lower_layer_prediction_horizontal_size | 14 | HORIZONTAL SIZE OF LOWER LAYER PREDICTION |
| lower_layer_prediction_vertical_size | 14 | VERTICAL SIZE OF LOWER LAYER PREDICTON |
| vertical_subsampling_factor_n | 5 | VERTICAL SUBSAMPLING FACTOR |
| TEMPORAL SCALABILITY MODE: | | |
| picture_mux_order | 3 | NUMBER OF ADDITIONAL LAYER PICTURES BERORE FIRST BASE LAYER IMAGE |
| picture_mux_factor | 3 | NUMBER OF ADDITIONAL LAYER PICTURES BETWEEN ADJACENT BASE LAYERS |
| user_data() | | USER DATA() |
| user_data | 8 | USER DATA |

FIG. 18

| CODE NAME | NUMBER OF BITS | DESCRIPTION |
|---|---|---|
| group_start_code | 32 | GOP START CODE |
| time_code | 25 | TIME CODE (HOUR, MINUTE, SECOND, PICTURE) |
| closed_gop | 1 | FLAG INDICATING INDEPENDENCE OF GOP |
| broken_link | 1 | FLAG INDICATING VALIDITY OF A B-PICTURE BEFORE AN I-PICTURE IN GOP |

FIG. 19

| CODE NAME | NUMBER OF BITS | DESCRIPTION |
|---|---|---|
| extension_data(2) | | EXTENSION DATA(2) |
| user_data() | | USER DATA() |
| user_data | 8 | USER DATA |

FIG. 20

| CODE NAME | NUMBER OF BITS | DESCRIPTION |
|---|---|---|
| picture_start_code | 32 | PICRURE START CODE |
| temporal_reference | 10 | ORDER OF DISPLAYING PICTURES IN GOP (MODULE 1024) |
| picture_coding_type | 3 | PICTURE CODING TYPE (I, P, B) |
| vbv_delay | 16 | VBV DELAY BEFORE THE START OF CODING |

FIG. 21

| CODE NAME | NUMBER OF BITS | DESCRIPTION |
|---|---|---|
| f_code[s][t] | 1 | RANGE OF MOTION VECTOR IN THE BACK-AND-FORTH DIRECTION (S) AND IN THE VERTICAL / HORIZONTAL DIRECTION (T) |
| intra_dc_precision | 2 | DC COEFFICIENT PRECISION OF INTRA MB |
| picture_structure | 2 | PICTURE STRUTURE (FIELD / FRAME) |
| top_field_first | 1 | DESIGNATION OF THE MANNER OF DISPLAYING FIELDS |
| frame_pred_frame_dct | 1 | FRAME PREDICTION AND FRAME DCT FLAG |
| concealment_motion_vector | 1 | CONCEALMENT MOTION VECTOR FLAG FOR INTRA MACRO BLOCK |
| q_scale_type | 1 | QUANTIZATION SCALE TYPE (LINEAR, NONLINEAR) |
| intra_vlc_format | 1 | VARIABLE LENGTH CODING FORMAT FOR INTRA MACRO BLOCK |
| alternate_scan | 1 | SCANNING TYPE (ZIG-ZAG, ALTERNATE) |
| repeat_first_field | 1 | DESIGNATION OF THE MANNER OF REPEATING 2-3 PULL-DOWN FILED |
| chroma_420_type | 1 | THIS CODE HAS THE ASME VALUE AS progressive_frame FOR 4:2:0 |
| progressive_frame | 1 | PROGRESSIVE FRAME FLAG |

FIG. 22

| CODE NAME | NUMBER OF BITS | DESCRIPRION |
|---|---|---|
| extension_data(3) | | EXTENSION DATA (3) |
| quant_matrix_extension() | | QUANTIZATION MATRIX EXTENSION () |
| intra_quantiser_matrix[64] | 8*64 | INTRA MACRO BLOCK QUANTIZATION MATRIX |
| non_intra_quantiser_matrix[64] | 8*64 | INTER MACRO BLOCK QUANTIZATION MATRIX |
| chrome_intra_quantiser_matrix[64] | 8*64 | CHROMA INTRA MACRO BLOCK QUANTIZATION MATRIX |
| chrome_non_intra_quantiser_matrix[64] | 8*64 | CHROMA INTER MACRO BLOCK QUANTIZATION MATRIX |
| copyright_extension() | | COPYRIGHT EXTENSION () |
| picture_display_extension() | | PICTURE DISPLAY EXTENSION () |
| picture_spatial_scalable_extension() | | PICTURE SPATIAL SCALABILTY EXTENSION () |
| spatial_temporal_weight_code_table_index | 2 | SPATIAL/TEMPORAL WEIGHTING CODE TABLE FOR VERTICAL SUBSAMPLING |
| lower_layer_progressive_frame | 1 | LOWER LAYER PROGRESSIVE FRAME SCANNING FLAG |
| lower_layer_deinterfaced_field_select | 1 | SELECTION OF A LOWER LAYER |
| picture_temporal_scalable_extension() | | PICTURE TEMPORAL SCALABILITY EXTENSION |
| reference_select_code | 2 | SELECTION OF A REFERENCE PICTURE |
| forward_temporal_reference | 10 | BACKWARD TEMPORAL REFERENCE |
| user_data() | 10 | USER DATA () |
| user_data | 8 | USER DATA |

| CODE NAME | NUMBER OF BITS | DESCRIPTION |
|---|---|---|
| slice() | | SLICE DATA () |

FIG. 25

| CODE NAME | NUMBER OF BITS | DESCRIPTION |
|---|---|---|
| slice_start_code | 32 | SLICE START CODE AND SLICE VERTICAL POSITION |
| slice_vertical_position_extension | 3 | SLICE VERTICAL POSITION EXTENSION (≧2800 LINES) |
| priority_breakpoint | 7 | DATA PARTIONING POINT |
| quantizer_scale_code | 5 | QUANTIZER SCALE CODE |
| intra_slice | 1 | INTRA SLICE FLAG |
| macroblock() | | MACRO BLOCK DATA() |

FIG. 26

| CODE NAME | NUMBER OF BITS | DESCRIPTION |
|---|---|---|
| macroblock_escape | 11 | MACRO BLOCK ADDRESS EXTENSION DATA (>33) |
| macroblock_address_increment | 1-11 | DEFFERENCE IN MACRO BLOCK ADDRESS BETWEEN CURRENT AND PREVIOUS MACRO BLOCKS |
| macroblock_modes() | | MACRO BLOCK MODES |
| macroblock_type | 1-9 | MACRO BLOCK CODING TYPE (MC, CODED, ETC.) |
| spatial_temporal_weight_code | 2 | SPATIAL / TEMPORAL WEIGHTING CODE FOR VERTICAL SAMPLING |
| frame_motion_type | 2 | FRAME MOTION COMPENSATION TYPE |
| field_motion_type | 2 | FILED MOTION COMPENSATION TYPE |
| dct_type | 1 | DCT TYPE (FIELD, FRAME) |
| quantiser_scale_code | 5 | MACRO BLOCK QUANTIZATION SCALE CODE (1-31) |
| motion_vectors(s) | | MOTION VECTORS (s) |
| motion_vertical_field_select[r][s] | 1 | SELECTION OF REFERRENCE FIELD USED IN PREDICTION |
| motion_vector[r][s] | | MOTION VECTOR (r,s) |
| motion_code[r][s][t] | 1-11 | BASIC DIFFERENCE MOTION VECTOR |
| motion_residual[r][s][t] | 1-8 | RESIDUAL VECTOR |
| dmvector[t] | 1-2 | DUAL PRIME DIFFERENCE VECTOR |
| coded_block_pattern | | CBP |
| block(i) | | BLOCK DATA () |

FIG. 27

| CODE NAME | NUMBER OF BITS | DESCRIPTION |
|---|---|---|
| dct_dc_size_luminance | 2-9 | SIZE OF DIFFERENCE OF LUMINANCE DCT DC COEFFICIENT |
| dct_dc_differencial | 1-11 | DIFFERENTIAL VALUE OF LUMINANCE DCT DC COEFFICIENT |
| dct_dc_size_chrominance | 2-10 | SIZE OF DIFFERENCE OF CHROMINANCE DCT DC COEFFICIENT |
| dct_dc_differecial | 1-11 | DIFFERENTIAL VALUE OF CHROMINANCE DCT DC COEFFICIENT |
| First_DCT_coefficient | 3-24 | FIRST NON-ZERO COEFFICIENT IN INTRA BLOCK |
| Subsquence_DCT_coefficients | 2-24 | SUBSEQUENT DCT COEFFICIENTS |
| End_of_Block | 2 or 4 | FLAG INDICATING OF THE END OF DCT COEFFICIENTS IN BLOCK |

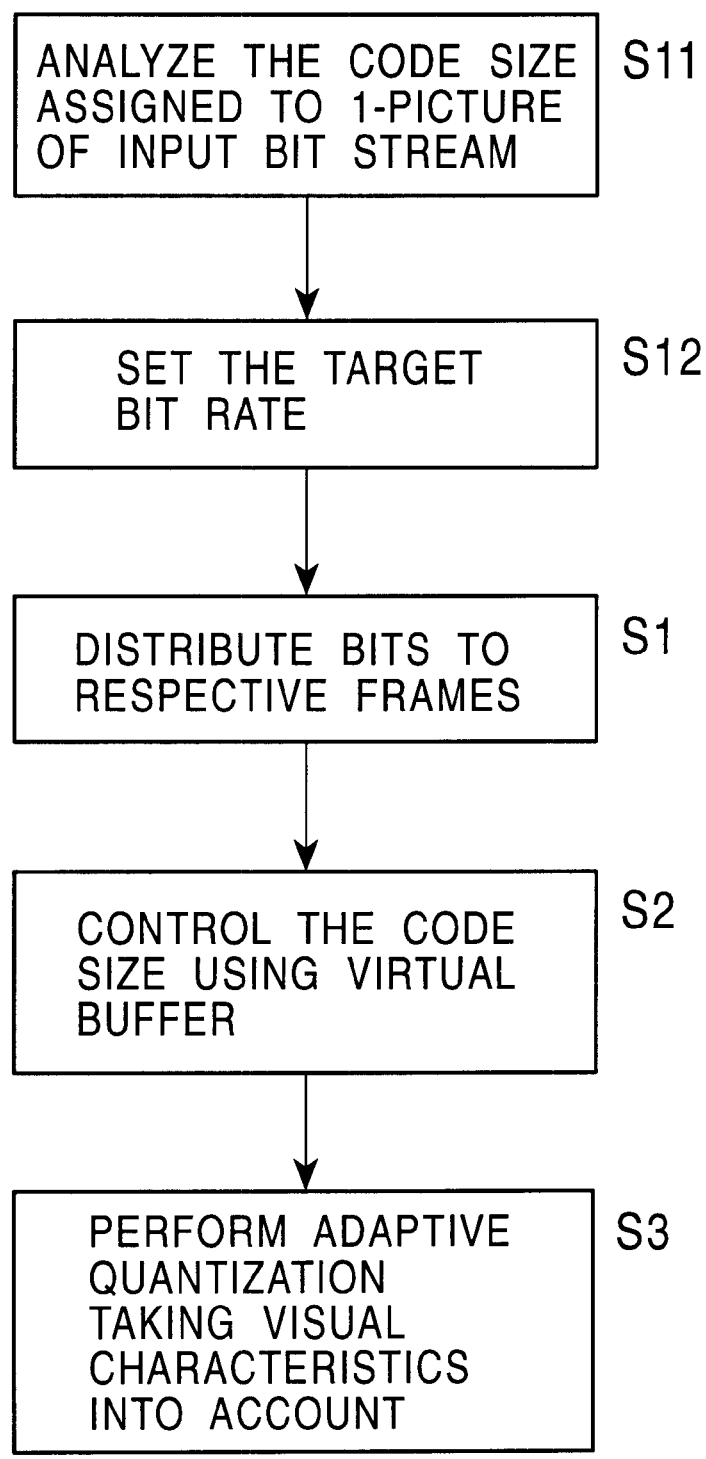

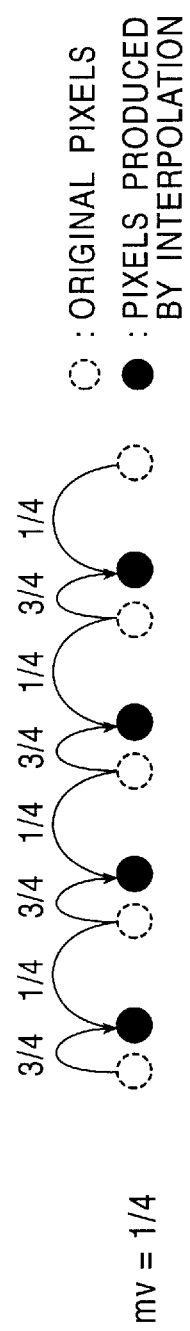
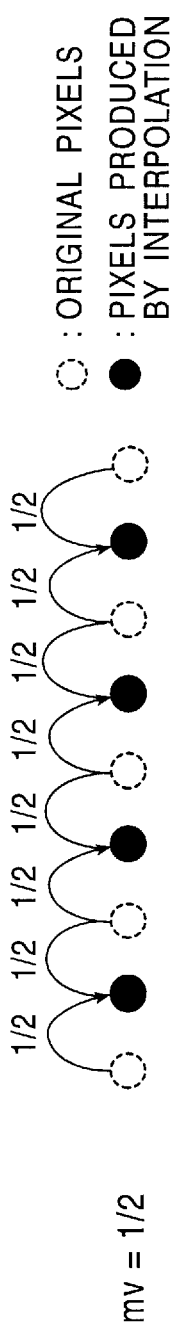
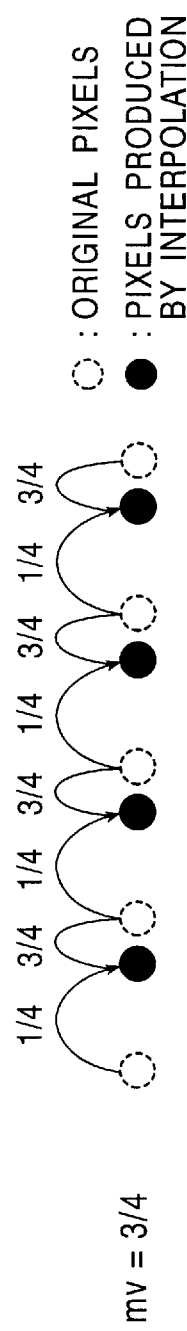
FIG. 35A  mv = 0
FIG. 35B  mv = 1/4
FIG. 35C  mv = 1/2
FIG. 35D  mv = 3/4

$$A = \frac{1}{\sqrt{2}}$$

$$B = -C_{\frac{1}{8}} + C_{\frac{3}{8}}$$

$$C = C_{\frac{1}{8}} + C_{\frac{3}{8}}$$

$$D = C_{\frac{3}{8}}$$

FIG. 38

$$[iD_{4\_ave}] = \begin{bmatrix} \frac{1}{2} & \frac{1}{2} & 0 & 0 & 0 & 0 & 0 & 0 \\ 0 & 0 & \frac{1}{2} & \frac{1}{2} & 0 & 0 & 0 & 0 \\ 0 & 0 & 0 & 0 & \frac{1}{2} & \frac{1}{2} & 0 & 0 \\ 0 & 0 & 0 & 0 & 0 & 0 & \frac{1}{2} & \frac{1}{2} \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} [iD_8] \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

FIG. 39

$$[iD_{4\_deci}] = \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix} [iD_8] \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

FIG. 40

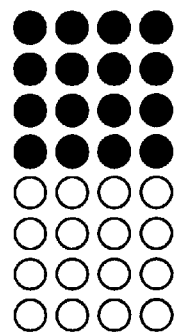

METHOD AND APPARATUS FOR CONVERTING IMAGE INFORMATION

BACKGROUND OF THE INVENTION

1. Field of the Invention

The present invention relates to a method and apparatus for converting image information in such a manner that an orthogonal transform is performed on a block-by-block basis, and orthogonal transform coefficients obtained via the orthogonal transform for each block are then quantized thereby converting the bit rate of image information which has been coded into a compressed form, wherein each block is a predefined pixel block called an orthogonal transform block. For example, when image information coded into a compressed form according to the MPEG-2 standard or the like is transmitted via a network for satellite broadcasting, cable television, or the like or when such image information is recorded on a recording medium such as an optical disk or a magnetic disk, the present invention is advantageously employed to reduce the bit rate of the compressed image information.

2. Description of the Related Art

In recent years, it has become popular to treat image information as digital data and compress the digital data by removing redundancy of image information by means of an orthogonal transform and motion compensation. The compressed data is transmitted via a network medium such as satellite broadcasting or cable television, or recorded on a storage medium such as an optical disk or a magnetic disk. In apparatus for such a purpose, a discrete cosine transform according to the MPEG-2 (Moving Picture Experts Group Phase-2) standard is widely used to compress image information.

In recent years, works are being performed to establish standards for digital television broadcasting using the image information compression technique according to MPEG-2 or the like. There are standards for digital television using a normal resolution image (consisting of effective horizontal lines of, for example, 576) and for digital television using a high resolution image (consisting of effective horizontal lines of, for example, 1152).

Because the amount of information of a high-resolution image is huge, a large code size (bit rate) is required to obtain sufficiently high image quality even when the image is coded into a compressed form according to the MPEG-2 standard or the like. For example, when each frame includes 1920 pixels×1080 pixels and is scanned in an interlaced fashion at 30 Hz, a bit rate as high as 18–22 Mbps or higher is required.

Therefore, when such a high-resolution image is transmitted via a network medium for satellite broadcasting, cable television, or the like, it is required to reduce the code size (bit rate) depending on the bandwidth of the transmission line used. When a high-resolution image is recorded on a storage medium such as an optical disk or a magnetic disk, it is required to further reduce the code size (bit rate) depending on the capacity of the storage medium. The reduction in the code size (bit rate) is required not only for high-resolution images but, in some cases, also even for normal-resolution images (for example, an image with a frame consisting of 720 pixels×480 pixels and scanned in an interlaced fashion at 30 Hz).

FIG. 41 illustrates a conventional image information conversion apparatus, including an image decoder 110 and an image coder 120, for reducing the code size (bit rate) of compressed image information (bit stream).

In this conventional image information conversion apparatus, compressed image information (bit stream) with a high bit rate is input to the image decoder 110. The image decoder 110 decodes the compressed image information with the high bit rate into baseband video data. The resultant baseband video data is applied to the image coder 120. The image coder 120 codes the baseband video data received from the image decoder 110 into compressed image information (bit stream) with a low bit rate. A target code size (target bit rate) smaller than the code size of the input compressed image information is set in the image coder 120, and the image coder 120 performs quantization corresponding to the target code size.

By performing the above-described process, the conventional image information conversion apparatus reduces the code size of compressed image information.

However, in the conventional image information conversion apparatus, because the entire decoding and coding processes are performed, a large scale hardware system is required. As a result, such image information conversion apparatus is expensive and consumes high electric power. Therefore, it is difficult to install such apparatus in consumer devices or portable devices. Furthermore, in the conventional image information conversion apparatus, it is required to completely perform all processes associated with decoding and coding, and thus a very large amount of calculation is required. When processes are performed by software with a general-purpose integrated circuit, the processes cannot be completed in real time if the circuit does not have high enough performance.

Furthermore, in the conventional image information conversion apparatus 120, in order to convert the input compressed image information with a high bit rate into information having a smaller target code size (target bit rate) than the code size of the input information, the input information is re-quantized using a large quantization step value. As a result, large quantization noise appears as block noise in the decoded image, and thus high image quality cannot be obtained.

Thus, an object of the present invention is to solve the problems described above. More specifically, the object is to provide a method and apparatus for converting image information in such a manner as to reduce the large code size (high bit rate) of the input compressed image information (bit stream) without causing significant degradation in image quality in the decoded image, and outputting the resultant compressed image information with the reduced code size (lowered bit rate).

SUMMARY OF THE INVENTION

According to an aspect of the present invention, there is provided an image information conversion apparatus for converting first compressed image information with a first bit rate to second compressed image information with a second bit rate lower than the first bit rate, the first compressed image information having been produced by coding an image signal into a compressed form by means of performing an orthogonal transform on a block-by-block basis and then quantizing orthogonal coefficients, obtained by the orthogonal transform, within the block, each block being a predetermined pixel block (orthogonal transform block), the image information conversion apparatus comprising: dequantization means for dequantizing the orthogonal transform coefficients, in accordance with the quantization step value of the orthogonal transform coefficients of the input first compressed image information; and quantization means for re-quantizing the orthogonal transform coefficients dequantized by the dequantization means, using a quantization step value which is set-so that the output second compressed image information has the second bit rate.

In this image information conversion apparatus, the orthogonal transform coefficients are dequantized and the resultant dequantized orthogonal transform coefficients are re-quantized using a different quantization step value.

The image information conversion apparatus may further comprise band limiting means for limiting high-frequency component values, in the horizontal direction, of the orthogonal transform coefficients dequantized by the dequantization means, wherein the quantization means re-quantizes the orthogonal transform coefficients including motion compensation error correction coefficients added by the addition means, using a quantization step value which is set so that the output second compressed image information has the second bit rate.

In this image information conversion apparatus, after limiting high-frequency component values of the dequantized orthogonal transform coefficients in the horizontal direction, the re-quantization is performed using a different quantization step value.

According to another aspect of the present invention, there is provided an image information conversion apparatus for converting first compressed image information with a first bit rate to second compressed image information with a second bit rate lower than the first bit rate, the first compressed image information having been produced by coding an image signal into a compressed form by means of performing an orthogonal transform on a block-by-block basis and then quantizing orthogonal coefficients, obtained by the orthogonal transform, within the block, each block being a predetermined pixel block (orthogonal transform block), the image information conversion apparatus comprising: first dequantization means for dequantizing the orthogonal transform coefficients, in accordance with the quantization step value of the orthogonal transform coefficients of the input first compressed image information; addition means for adding motion compensation error correction coefficients to the orthogonal transform coefficients dequantized by said first dequantization means; quantization means for re-quantizing the orthogonal transform coefficients including motion compensation error correction coefficients added by the addition means, using a quantization step value which is set so that the output second compressed image information has the second bit rate; second dequantization means for dequantizing the orthogonal transform coefficients re-quantized by said quantization means; subtraction means for subtracting the orthogonal transform coefficients including motion compensation error correction coefficients added by the addition means from the orthogonal transform coefficients dequantized by the second dequantization means; and motion compensation error correction means for generating the motion compensation error correction coefficients by means of: performing an orthogonal transform upon the subtracted orthogonal transform coefficients and performing motion compensation in accordance with a motion vector; and performing an inverse orthogonal transform upon the motion-compensated values.

In this image information conversion apparatus, the orthogonal transform coefficients are dequantized and then re-quantized using a different quantization step value, and, furthermore, motion compensation is performed upon the difference between the input orthogonal transform coefficients and the re-quantized orthogonal transform coefficients thereby correcting errors caused by motion compensation.

This image information conversion apparatus may further comprises band limiting means for limiting high-frequency component values, in the horizontal direction, of the orthogonal transform coefficients dequantized by the first dequantization means, wherein the quantization means re-quantizes the orthogonal transform coefficients including motion compensation error correction coefficients added by the addition means, using a quantization step value which is set so that the output second compressed image information has-the second bit rate;

In this image information conversion apparatus, after limiting high-frequency component values of the dequantized orthogonal transform coefficients in the horizontal direction, the re-quantization is performed using a different quantization step value, and furthermore, motion compensation is performed upon the difference between the input orthogonal transform coefficients and the re-quantized orthogonal transform coefficients thereby correcting errors caused by motion compensation.

In the image information conversion apparatus, the orthogonal transform coefficients may consist of 8 coefficients in the horizontal direction by 8 coefficients in the vertical direction, that is, 8×8 coefficients, and the motion compensation error correction means may comprise: a 4×8 inverse orthogonal transformer for performing a 4×8 inverse orthogonal transform upon quantization error coefficients consisting of 8 coefficients in the horizontal direction by 8 coefficients in the vertical direction, thereby generating quantization error values in the space domain; a motion compensator for performing motion compensation upon the space-domain quantization error values generated by the 4×8 inverse orthogonal transformer, with precision of ¼ pixels in the horizontal direction and ½ pixels in the vertical direction thereby generating quantization error correction values in the space domain; and a 4×8 orthogonal transformer for performing a 4×8 orthogonal transform upon the space-domain quantization error correction values generated by the motion compensator thereby generating the motion compensation error correction coefficients in the frequency domain.

In this image information conversion apparatus, after limiting high-frequency component values of the dequantized orthogonal transform coefficients in the horizontal direction, the re-quantization is performed using a different quantization step value, and furthermore, motion compensation is performed upon differential values between the input orthogonal transform coefficients and the re-quantized orthogonal transform coefficients, for low-frequency 4 coefficients in the horizontal direction and 8 coefficients in the vertical horizontal direction thereby correcting errors caused by motion compensation.

According to another aspect of the present invention, there is provided an image information conversion method for converting first compressed image information with a first bit rate to second compressed image information with a second bit rate lower than the first bit rate, the first compressed image information having been produced by coding an image signal into a compressed form by means of performing an orthogonal transform on a block-by-block basis and then quantizing orthogonal coefficients, obtained by the orthogonal transform, within the block, each block being a predetermined pixel block (orthogonal transform block), the image information conversion method comprising the steps of: inputting the first compressed image information with the first bit rate; dequantizing the orthogonal transform coefficients, in accordance with the quantization step value of the orthogonal transform coefficients of the input first compressed image information; re-quantizing the orthogonal transform coefficients dequantized in the dequantization step, using a quantization step value which is set so that the output second compressed image information has the second bit rate; and outputting the second compressed image information generated in the re-quantization step.

In this image information conversion method, the orthogonal transform coefficients are dequantized and the resultant dequantized orthogonal transform coefficients are re-quantized using a different quantization step value.

In this image information conversion method, high-frequency component values, in the horizontal direction, of the dequantized orthogonal transform coefficients may be limited, and the orthogonal transform coefficients limited in terms of the high-frequency components may be re-quantized using a quantization step value which is set so that the output second compressed image information has the second bit rate.

In this image information conversion method, when the re-quantization is performed after limiting high-frequency component values of the dequantized orthogonal transform coefficients in the horizontal direction, a different quantization step value is employed in the re-quantization.

According to still another aspect of the present invention, there is provided an image information conversion method for converting first compressed image information with a first bit rate to second compressed image information with a second bit rate lower than the first bit rate, the first compressed image information having been produced by coding an image signal into a compressed form by means of performing an orthogonal transform on a block-by-block basis and then quantizing orthogonal coefficients, obtained by the orthogonal transform, within the block, each block being a predetermined pixel block (orthogonal transform block), the image information conversion method comprising the steps of: inputting the first compressed image information with the first bit rate; dequantizing the orthogonal transform coefficients, in accordance with the quantization step value of the orthogonal transform coefficients of the input first compressed image information; adding motion compensation error correction coefficients to the dequantized orthogonal transform coefficients; re-quantizing the orthogonal transform coefficients including motion compensation error correction coefficients added in the addition step, using a quantization step value which is set so that the output second compressed image information has the second bit rate; outputting the second compressed image information generated in the re-quantization step, generating the motion compensation error correction coefficients by means of: dequantizing the re-quantized orthogonal transform coefficients; subtracting the orthogonal transform coefficients including the added motion compensation correction coefficients from the dequantized orthogonal transform coefficients; performing an orthogonal transform upon the subtracted orthogonal transform coefficients and performing motion compensation in accordance with a motion vector; and performing an inverse orthogonal transform upon the motion-compensated values.

In this image information conversion method, the orthogonal transform coefficients are dequantized and the resultant dequantized orthogonal transform coefficients are re-quantized using a different quantization step value, and, furthermore, motion compensation is performed upon the difference between the input orthogonal transform coefficients and the re-quantized orthogonal transform coefficients thereby correcting errors caused by motion compensation.

In the image information conversion method, high-frequency component values, in the horizontal direction, of the dequantized orthogonal transform coefficients may be limited, and the orthogonal transform coefficients limited in terms of the high-frequency components may be re-quantized using a quantization step value which is set so that the output second compressed image information has the second bit rate.

In this image information conversion method, after limiting high-frequency component values of the dequantized orthogonal transform coefficients in the horizontal direction, the re-quantization is performed using a different quantization step value, and furthermore, motion compensation is performed upon the difference between the input orthogonal transform coefficients and the re-quantized orthogonal transform coefficients thereby correcting errors caused by motion compensation.

In the image information conversion method, the orthogonal transform coefficients may consist of 8 coefficients in the horizontal direction by 8 coefficients in the vertical direction, that is, 8×8 coefficients, and the frequency-domain motion compensation error correction coefficients may be generated by means of: performing a 4×8 inverse orthogonal transform upon quantization error coefficients consisting of 8 coefficients in the horizontal direction by 8 coefficients in the vertical direction, thereby generating quantization error values in the space domain; performing motion compensation upon said space-domain quantization error values, with precision of ¼ pixels in the horizontal direction and ½ pixels in the vertical direction thereby generating quantization error correction values in the space domain; and performing a 4×8 orthogonal transform upon the quantization error correction values in the space-domain.

In this image information conversion method, after limiting high-frequency component values of the dequantized orthogonal transform coefficients in the horizontal direction, the re-quantization is performed using a different quantization step value, and furthermore, motion compensation is performed upon differential values between the input orthogonal transform coefficients and the re-quantized orthogonal transform coefficients, for low-frequency 4 coefficients in the horizontal direction and 8 coefficients in the vertical horizontal direction thereby correcting errors caused by motion compensation.

BRIEF DESCRIPTION OF THE DRAWINGS

FIG. 2 illustrates a frame sorting process performed a frame sorting buffer of the MPEG-2 image information coding apparatus, wherein FIG. 2A illustrates the order of frames before being sorted and FIG. 2B illustrates the order of sorted frames;

FIG. 6 is a schematic diagram illustrating the order of scanning discrete cosine transform coefficients in a variable length coding process, wherein FIG. 6A illustrates the scanning order according to a zigzag scanning method, and FIG. 6B illustrates the scanning order according to an alternate scanning method;

FIG. 7 is a table illustrating the relationship between the inverse quantization multiplication factor and the intra DC precision;

FIG. 8 is a schematic diagram illustrating default values of quantization matrices wherein FIG. 8A illustrates a quantization matrix having default values used for intra macroblocks, and FIG. 8B illustrates a quantization matrix having default values used for inter macroblocks;

FIG. 9 is a table illustrating quantiser_scale defined in syntax of MPEG-2 compressed image information (bit stream);

FIG. 13 is a table showing code values of start codes of the respective layers of the MPEG-2 compressed image information (bit stream);

FIG. 15 is a table showing information described in a sequence header;

FIG. 16 is a table showing information described in a sequence extension;

FIG. 17 is a table showing information described in an extension & user data (1);

FIG. 18 is a table showing information described in a GOP header;

FIG. 19 is a table showing information described in an extension & user data (2);

FIG. 20 is a table showing information described in a picture header;

FIG. 21 is a table showing information described in a picture coding extension;

FIG. 22 is a table illustrating information contained in an extension and user data (3);

FIG. 25 is a table of information contained in slice data;

FIG. 26 is a table of information contained in macroblock data;

FIG. 27 is a table of information contained in block data;

FIG. 29 is a schematic diagram illustrating examples of the process of limiting high-frequency components of discrete cosine transform coefficients in the horizontal direction, performed by a band limiter of the image information conversion apparatus, wherein

FIG. 30 is a flow chart illustrating the operation of a code size controller of the image information conversion apparatus;

FIG. 31 is a schematic diagram illustrating the process of scanning discrete cosine transform coefficients according to an alternate scanning method regardless of the scanning method of an input signal, wherein

FIGS. 35A–D are schematic diagrams illustrating an interpolating process with precision of ¼ pixels in the horizontal direction by means of linear interpolation;

FIG. 38 illustrates an equation for performing an inverse discrete cosine transform and an averaging process using a single matrix;

FIG. 39 illustrates an equation for performing an inverse discrete cosine transform and a skipping process using a single matrix;

FIG. 40 is a schematic diagram illustrating the process of replacing high-frequency 4 coefficients, in the vertical direction, of discrete cosine transform coefficients of a color difference signal with 0.

DESCRIPTION OF THE PREFERRED EMBODIMENT

The present invention is described in further detail below with reference to embodiments of image information conversion apparatus capable of reducing the code size (bit rate) of compressed image information (bit stream) coded in accordance with the MPEG-2 standard. MPEG-2 (ISO/IEC138182) is a standard of a method of compressing image information, which is adapted to both interlaced scanning and sequential scanning and is also adapted to both standard resolution and high resolution.

Before describing the embodiment of the image information conversion apparatus according to the present invention, there are described an MPEG-2 image information coding apparatus for coding image information into a compressed form according to the MPEG-2 standard and the data structure of the MPEG-2 compressed image information.

Image Information Coding Apparatus

Figure 1:
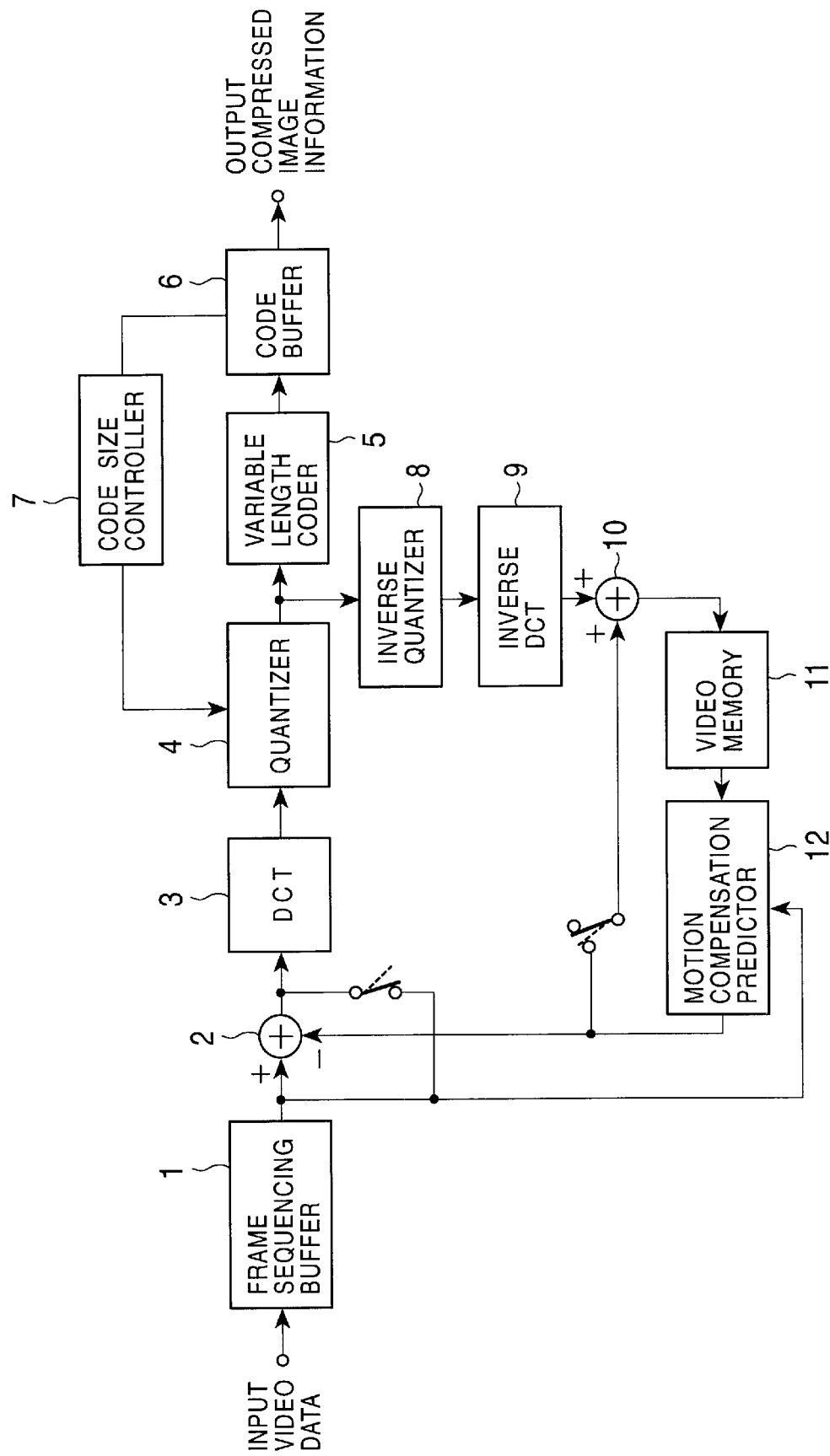
FIG. 1 is a block diagram of an MPEG-2 image information coding apparatus.

FIG. 1 is a block diagram illustrating an image information coding apparatus according to the MPEG-2 standard.

As shown in FIG. 1, this MPEG-2 image information coding apparatus includes a frame sorting buffer 1, an adder 2, a DCT (discrete cosine transform) converter 3, a quantizer 4, a variable length coder 5, a code buffer 6, a code size controller 7, an inverse quantizer 8, an inverse DCT converter 9, an adder 10, a video memory 11, and a motion compensation predictor 12.

Baseband video data is input to the frame sorting buffer 1. The frame sorting buffer 1 rearranges the positions of frames of the received video data from the temporal order into the order in which MPEG-2 coding is performed.

Figure 2:
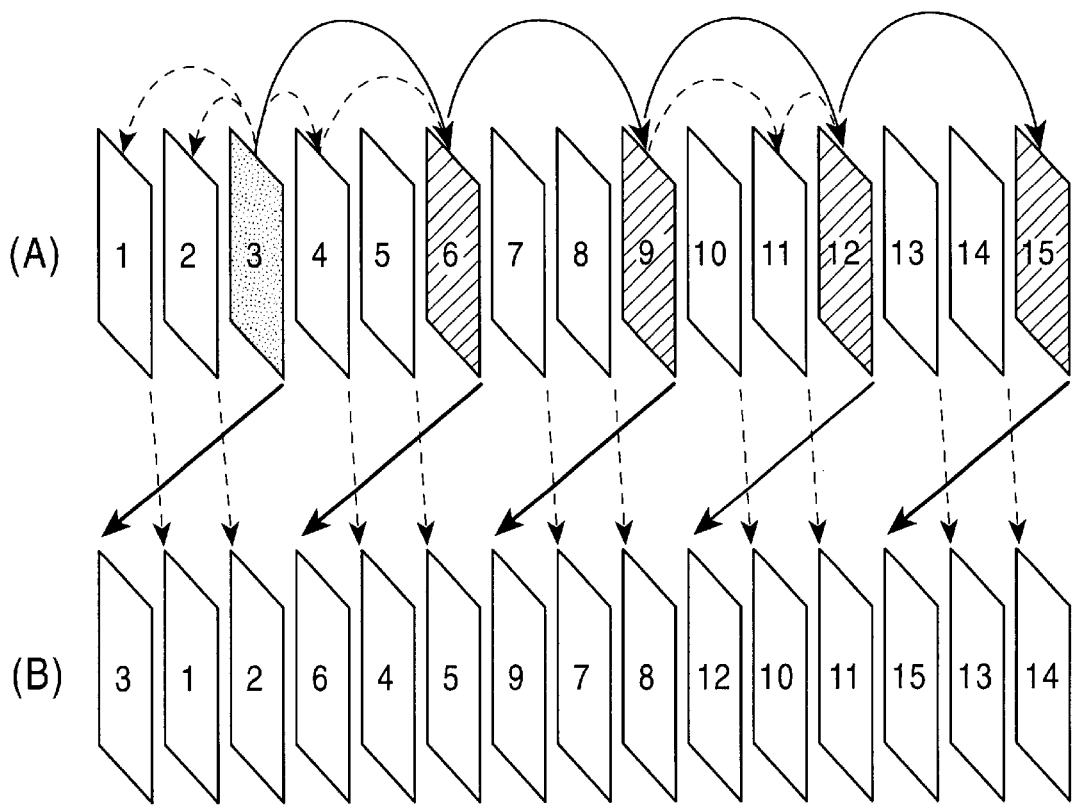

FIG. 2 illustrates an example of the rearrangement process performed by the frame sorting buffer 1.

When video data is given which includes frames arranged in the temporal order as shown in FIG. 2A, the MPEG-2 image information coding apparatus first codes a frame at the 3rd position in the temporal order by means of intra frame coding. Using this frame at the 3rd position as a reference frame, a frame at the 6th position in the temporal order is then coded by means of predictive coding. Subsequently, frames at 4th and 5th positions are coded by means of predictive coding using the frames at the 3rd and 6th positions as reference frames. In view of the above, the frame sorting buffer 1 rearranges the positions of the frames as shown in FIG. 2B. The MPEG-2 standard defines GOP (group of pictures). The GOP includes a picture coded by means of intra frame coding and also includes pictures coded by means of inter frame coding on the basis of the intra frame coded picture. The present MPEG-2 image coding apparatus codes GOPs each including one picture coded by means of intra frame coding (hereinafter, such a picture will be referred to as an I-picture), 4 pictures coded by means of inter frame coding using one reference frame (at a past position on the time axis) as a prediction frame (hereinafter, such a picture will be referred to as a P-picture), 10 pictures coded by means of inter frame coding using two reference frames (at positions, on the time axis, before and after the position of a current frame) as prediction frames (hereinafter, such a picture will be referred to as a B-picture). That is, each GOP includes 15 pictures in total.

After being sorted by the frame sorting buffer 1, the frames are sent to the adder 2.

In the case where the adder 2 receives a P-picture frame or a B-picture frame, the adder 2 subtracts, from that frame, a predicted frame produced by the motion compensation predictor 12 which will be described later. The resultant data is sent to the DCT converter 3. In the case where the frame input to the adder 2 is an I-picture frame, the adder 2 sends the received frame directly to the DCT converter 3 without performing subtraction.

Figure 3:
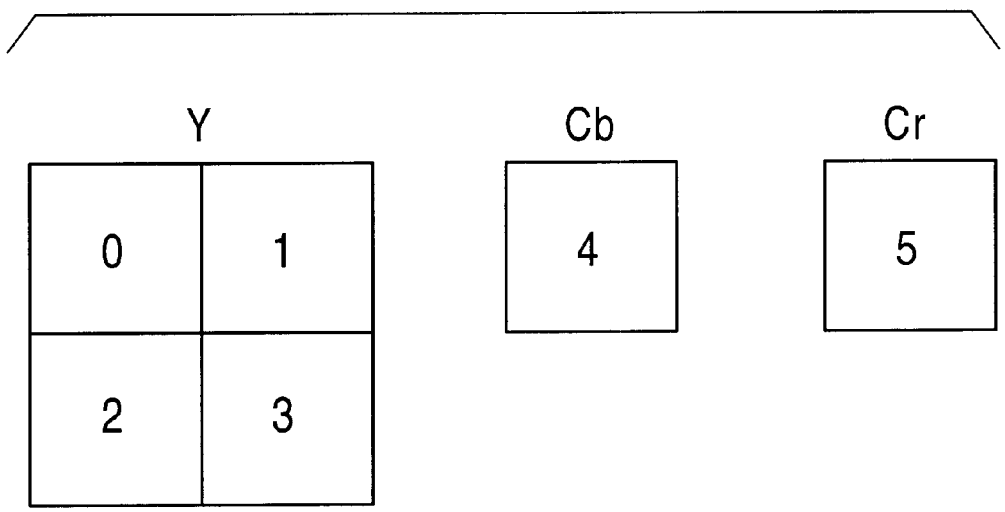
FIG. 3 is a schematic diagram illustrating the structure of macroblocks for the case where video data is a 4:2:0 signal.
Figure 4:
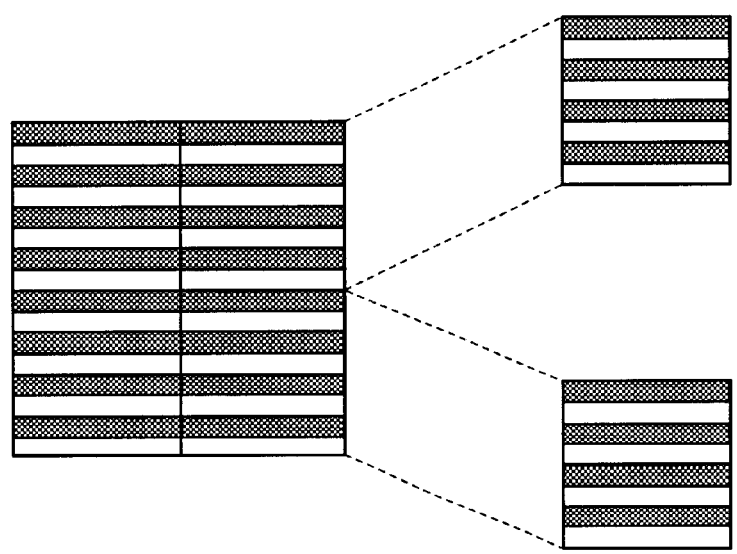
FIG. 4 is a schematic diagram illustrating DCT blocks in a frame discrete cosine transform mode.
Figure 5:
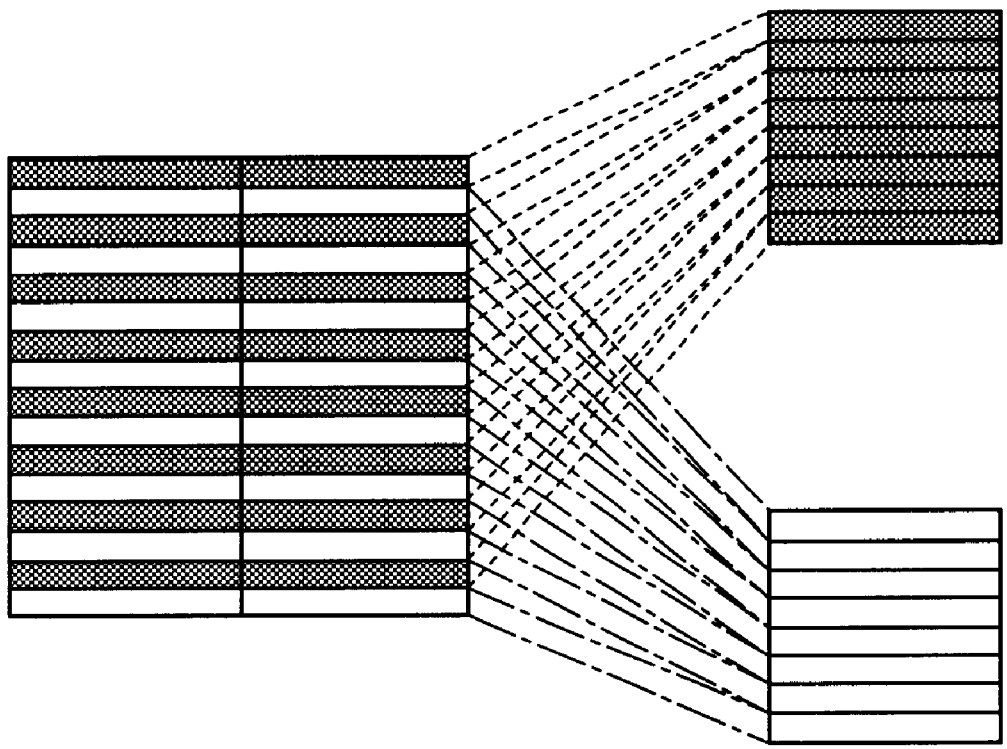
FIG. 5 is a schematic diagram illustrating DCT blocks in a field discrete cosine transform mode.

The DCT converter 3 divides each frame into blocks (DCT blocks) each including 8×8 pixels and performs 8th order discrete cosine transform upon each DCT block in both horizontal and vertical directions. In the discrete cosine transform, a 2-dimensional image signal is converted, by means of orthogonal transformation, into spatial frequency coefficients (discrete cosine transform coefficients). In this discrete cosine transform, if input video data is a signal with Y:U:V=4:2:0 such as that shown in FIG. 3, the discrete cosine transform is performed on a block-by-block basis wherein each block includes 16 pixel×16 pixels of a luminance signal and 8 pixel×8 pixels of a color difference signal (hereinafter, such a block will be referred to as a macroblock). In this case, the DCT converter 3 performs the discrete cosine transform upon the luminance signal in a mode which is selected from two modes so that the selected mode results in a higher coding efficiency. Herein, in one mode, discrete cosine transform is performed upon 8 pixels×8 pixels on a frame-by-frame basis as shown in FIG. 4 (hereinafter, this mode will be referred to as a frame discrete cosine transform mode). In the other mode, as shown in FIG. 5, macroblock data are grouped by fields, and then discrete cosine transform is performed upon 8 pixels×8 pixels (hereinafter, this mode will be referred to as a field discrete cosine transform mode).

The resultant data obtained through the discrete cosine transform performed by the DCT converter 3 is sent to the quantizer 4.

The quantizer 4 quantizes the 8th order discrete cosine transform coefficients in the horizontal and vertical directions, using a predetermined quantization matrix. The quantization scale of the quantization matrix is controlled by the code size controller 7 in accordance with a target code size (target bit rate) which has been determined in advance, so that overflowing or underflowing does not occur in the code buffer 6 disposed at a subsequent stage. The quantizer 4 sends the resultant quantized discrete cosine transform coefficients to the variable length coder 5 and also to the inverse quantizer 8.

The variable length coder 5 performs variable length coding upon the quantized discrete cosine transform coefficients such that the average code length is minimized. In this process, for the DC components of the discrete cosine transform coefficients, the variable length coder 5 employs the DC components of the immediately previous block as predicted values and codes the difference between the DC components of the current block and the predicted values. For the other components, the variable length coder 5 rearranges the coefficients into a one-dimensional array in accordance with a predetermined scanning method (zigzag scanning method or alternate scanning method), and the variable length coder 5 codes the rearranged coefficients by employing, as an event, each pair of the number of successive zero coefficients (run) and successive non-zero coefficients (level).

FIG. 6A illustrates the order in which the 8th order discrete cosine transform coefficients in horizontal and vertical directions are scanned in the zigzag fashion. FIG. 6B illustrates the order in which the 8th order discrete cosine transform coefficients in horizontal and vertical directions are scanned in the alternate fashion. When a DCT block is scanned, if the scanning point has reached a point the coefficients following which are all zero, the quantizer 4 outputs a code called EOB (end of block), and thus the variable length coding for that block is completed.

After being coded by the variable length coder 5, the resultant discrete cosine transform coefficients are sent to the code buffer 6 and temporarily stored therein. Compressed image information in the form of a bit stream according to the MPEG-2 standard is then output from the code buffer 6.

The data quantized by the quantizer 4 is also sent to the inverse quantizer 8. The inverse quantizer 8 dequantizes the received data and sends the resultant data to the inverse DCT converter 9.

The inverse DCT converter 9 performs inverse discrete cosine transform upon the dequantized discrete cosine transform coefficients. Pixel values obtained via the inverse discrete cosine transform are stored into the video memory 11 via the adder 10.

In the case where the frame sent from the inverse DCT converter 9 to the adder 10 is a P-picture frame, the adder 10 adds the received frame to a reference frame produced by the motion compensation predictor 12 which will be described later, and stores the resultant data into the video memory 11. In the case where the frame sent from the inverse DCT converter 9 to the adder 10 is an I-picture frame, the adder 10 directly stores the received frame into the video memory 11 without performing addition.

The motion compensation predictor 12 detects motion vector information, with precision of ½ pixels, associated with P-pictures and B-pictures of each macroblock, by means of a block matching method or the like. The detected motion vector information is incorporated into compressed image information (bit stream) output from the code buffer 6 and transmitted to the outside. The motion compensation predictor 12 also performs motion compensation upon the pixel data stored in the video memory 11, in accordance with the detected vector information thereby producing predicted P-picture and B-picture frames. The resultant predicted frames are supplied to the adder 2.

I-picture frames are coded by means of intra-frame predictive coding, and thus detection of motion vector information is not performed upon I-picture frames. In the case where, in the coding based on motion vectors, a high coding efficiency is not obtained for a P-picture frame or a B-picture frame, the P-picture frame or B-picture frame may be coded by means of intra-frame predictive coding on a macroblock-by-macroblock basis. Hereinafter, a macroblock coded on the basis of intra frame prediction is referred to as an intra macroblock, and a macroblock coded on the basis of inter frame prediction is referred to as an inter macroblock. Macro blocks included in an I-picture frame are all intra macroblocks.

In the MPEG-2 image information coding apparatus shown in FIG. 1, as described above, input baseband video data is coded, and resultant data is output as compressed image information (bit stream).

Now, the quantization process performed by the quantizer 4 is described in further detail below.

The DC coefficient of an intra macroblock is quantized in accordance with equation (1) described blow.

$$F''[0][0] = (\text{intra\_dc\_mult}) \times QF[0][0] \quad (1)$$

where F''[0][0] is a representative quantized DC coefficient value, QF[0][0] is the level number of the representative quantized DC coefficient value, and intra_dc_mult (inverse quantization multiplication factor) is a variable which may be set for each frame, as shown in FIG. 7. The inverse quantization multiplication factor (intra_dc_mult) is determined by the intra DC precision.

For coefficients of an intra macroblock other than the DC coefficient, quantization is performed in accordance with equation (2) described below.

$$F''[u][v] = ((2 \times QF[u][v] + k) \, W[w][v][u] \times \text{quantiser\_scale})/32 \quad (2)$$

In equation (2), F''[u][v] is a representative quantized value of a (u,v)th coefficient, and QF[u][v] is the level number of the representative quantized value of the (u,v)th coefficient. k in equation (2) is given by equation (3) described below.

$$k = \begin{cases} 0 & \text{(for intra macro block)} \\ \text{Sign}(QF[v][u]) & \text{(for intra macro block)} \end{cases} \quad (3)$$

where W[w][v][u] is a quantization matrix, and quantiser_scale is a quantization scale.

The quantization matrix is set so as to designate relative quantization step values for the respective discrete cosine transform coefficients in a DCT block. More specifically, the quantization matrix is set such that high-frequency discrete cosine transform coefficients are quantized with a large quantization step value because degradation thereof is less perceptible to human eyes, while low-frequency discrete cosine transform coefficients are quantized with a small quantization step value because degradation thereof is more perceptible to human eyes. That is, the quantization matrix allows the code size to be reduced while minimizing degradation in image quality.

The quantization matrix may be set for each frame. If the particular quantization matrix is not set, a quantization matrix having default values such as those shown in FIG. 8A is used for intra macroblocks, and a quantization matrix having default values such as those shown in FIG. 8B is used for inter macroblocks.

As described in FIG. 9, quantiser_scale (quantization scale) is described in syntax in the MPEG-2 compressed image information (bit stream) by q_scale_type (quantization scale type) defined for each frame and by q_scale_code (quantization scale code) defined for each macroblock. Assignment of q-scale_code to respective macroblocks is performed by the code size controller 7.

The process performed by the code size controller 7 is described in further detail below.

The process performed by the code size controller 7 is not defined in the MPEG-2 (ISO/IEC13818-2) standard. Therefore, the designer of the code size controller 7 may freely design it so as to achieve better image quality without increasing the code size, under the constraint that neither overflowing nor underflowing occurs in the code buffer 6. Generally, the process associated with the code size controller 7 may be performed according to a method described in MPEG-2 Test Model 5 (ISO/IEC JTC1/SC29/WG11 N0400). The process according to this method is described below with reference to the flow chart shown in FIG. 10.

Figure 10:
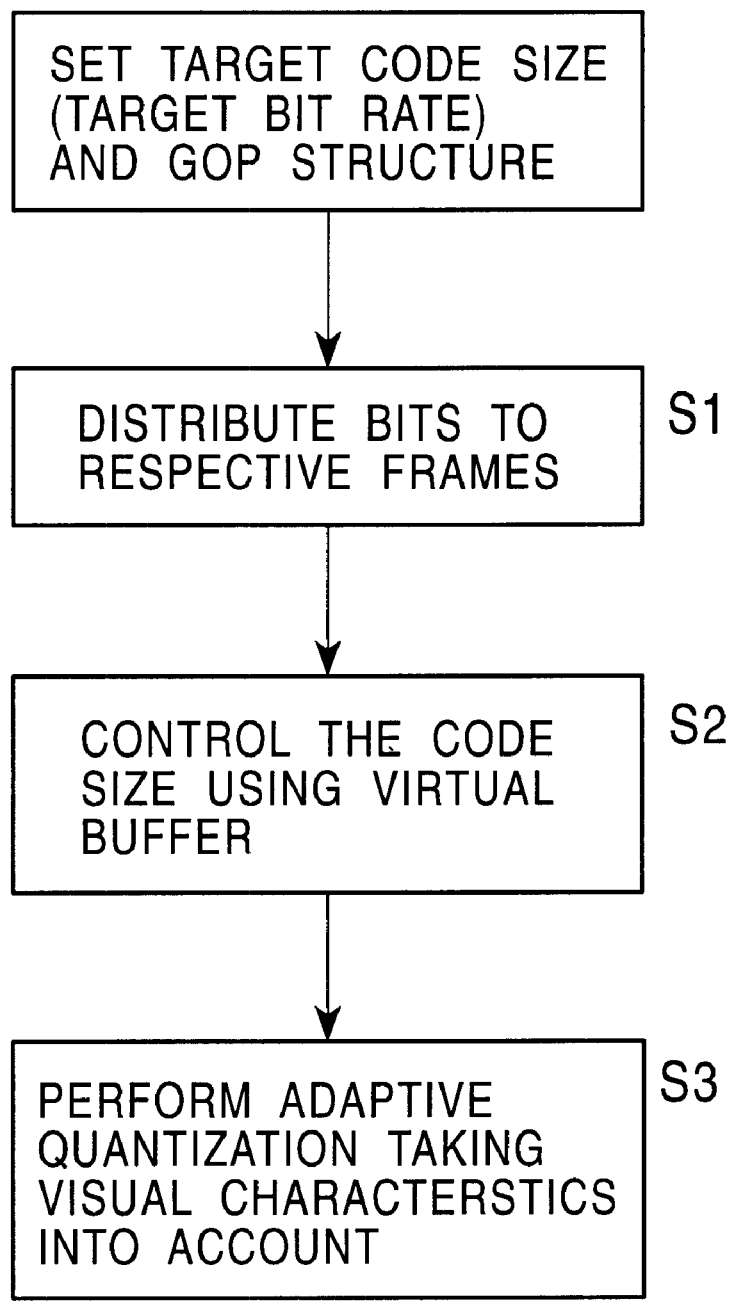
FIG. 10 is a flow chart illustrating the operation of a code size controller of the MPEG-2 image information coding apparatus.

As shown in FIG. 10, the code size controller 7 sets the target code size (target bit rate) and GOP elements. Thereafter, in step S1, the numbers of bits are assigned to the respective pictures in accordance with the target code size and the GOP elements. Then in step S2, the bit rate is controlled using the virtual buffers. Finally, in step S3, adaptive quantization is performed taking the visual characteristics into account. The code size controller 7 performs the above process while monitoring the fullness of the code buffer 6.

In step S1 described above, the number of bits (hereinafter represented by R) assigned to pictures including a current picture in a GOP, which have not been coded yet, are distributed to those pictures, respectively. The assignment of the number of bits is performed in the order of pictures in the GOP, on the first and second assumptions described below.

The first assumption is that the average quantization scale code used in the coding for each picture times the generated code size (picture complexity) has a constant value depending on the picture type, as along as there is no change in the scene. After coding each picture, variables Xi, Xp, and Xb (global complexity measure) representing the picture complexity are updated in accordance with equation (4) described below.

$$X_i = S_i Q_i$$

$$X_p = S_p Q_p$$

$$X_b = S_b Q_b \quad (4)$$

where Si, Sp, and Sb are numbers of bits of codes generated by the coding for the respective pictures, and Qi, Qp, and Qb are average quantization scale codes used in the coding for the respective pictures.

The initial values of the variables Xi, Xp, and Xb representing the picture complexity are given by equations (5), (6), and (7), respectively, using the target code size (target bit rate) bit_rate (bits/sec).

$$X_i = 160 \times \text{bit\_rate}/115 \quad (5)$$

$$X_p = 60 \times \text{bit\_rate}/115 \quad (6)$$

$$X_b = 42 \times \text{bit\_rate}/115 \quad (7)$$

The second assumption is that the overall image quality becomes optimum when the ratios Kp and Kb of the quantization scale codes for P- and B-pictures, respectively, to the quantization scale code for the I-picture are set as follows.

$$K_p = 1.0, K_b = 1.4 \quad (8)$$

On the first and second assumptions described above, the number of bits (Ti, Tp, and Tb) assigned to the respective pictures in the GOP are given by equations (9), (10), and (11) described below.

$$T_i = \max\left\{ \frac{R}{1 + \frac{N_p X_p}{X_i K_p} + \frac{N_b X_b}{X_i K_b}}, \text{bit\_rate}/(8*\text{picture\_rate}) \right\} \quad (9)$$

$$T_p = \max\left\{ \frac{R}{N_p + \frac{N_b K_p X_b}{K_b X_p}}, \text{bit\_rate}/(8 \times \text{picture\_rate}) \right\} \quad (10)$$

$$T_b = \max\left\{ \frac{R}{N_b + \frac{N_p K_b X_p}{K_p X_b}}, \text{bit\_rate}/(8 \times \text{picture\_rate}) \right\} \quad (11)$$

In equations (9)–(11), Np and Nb represent the number of P- and B-pictures, respectively, which have not been coded yet.

On the basis of the assigned number of bits determined in the above-described manner, the number of bits R assigned to the remaining pictures to be coded, in the GOP, is updated in accordance with equation (12) described below, each time a picture is coded.

$$R = R - S_{i,p,b} \quad (12)$$

In the case where the first picture in a GOP is coded, R is updated in accordance with equation (13) described below.

$$R = \text{bit\_rate} \times N/\text{picture\_rate} + R \quad (13)$$

In equation (13), N is the number of pictures in a GOP, and O represents the first value of R in the sequence.

Thereafter, in step S2, the quantization scale codes are determined by means of feedback control for each macroblock in accordance with the capacity of three virtual buffers separately set for the respective picture types, such that the numbers of actually generated bits become equal to the number of bits (Ti, Tp, Tb) assigned to the respective pictures.

First, before coding a jth macroblock, the fullness values of the virtual buffers are determined in accordance with equations (14), (15), and (16) described below.

$$d_j^i = d_0^i + B_{j-1} - \frac{T_i \times (j-1)}{\text{MB\_cnt}} \quad (14)$$

$$d_j^p = d_0^p + B_{j-1} - \frac{T_p \times (j-1)}{\text{MB\_cnt}} \quad (15)$$

$$d_j^b = d_0^b + B_{j-1} - \frac{T_b \times (j-1)}{\text{MB\_cnt}} \quad (16)$$

In equations (14)–(16), $d_o^i$, $d_o^p$, and $d_o^b$ are initial fullness values of virtual buffers for I-, P-, and B-pictures, respectively, $B_j$ represents the number of bits generated from the beginning of a picture to a jth macroblock, and MB_cnt represents the number of macroblocks in an I-picture. The fullness values ($d_{MB\_cnt}^i$, $d_{MB\_cnt}^p$, $d_{MB\_cnt}^b$) of the respective virtual buffers at the end of coding for the respective pictures are employed as the initial fullness values ($d_o^i$, $d_o^p$, $d_o^b$) of the virtual buffers for the following pictures of the same picture types.

Thereafter, the quantization scale code for the jth macroblock is calculated in accordance with equation (17) described below.

$$Q_j = \frac{d_j \times 31}{r} \quad (17)$$

In equation (17), r is a variable called a reaction parameter which controls the response of the feedback loop, and which is given by equation (18) described below.

$$r = 2 \times \text{bit\_rate}/\text{picture\_rate} \quad (18)$$

At the beginning of the coding process, the virtual buffers have initial values given by equation (19) described below.

$$d_o^i = 10 \times r/31, \ d_o^p = K_p d_o^i, \ d_o^b = K_b d_o^i \quad (19)$$

Finally, in step S3, the quantization scale code determined in step S2 is modified in accordance with a variable called activity defined for each macroblock so that plain parts whose degradation is conspicuous are quantized with a smaller quantization step value and complicated patterns whose degradation is rather inconspicuous are quantized with a larger quantization step value.

The activity $act_j$ is represented by luminance pixel values of the original image, of four blocks in the frame discrete cosine transform mode and four blocks in the field discrete cosine transform mode, and thus of eight block in total, in accordance with equations (20), (21), and (22), described below.

$$act_j = 1 + \min_{sblk=1..8} (\text{var\_sblk}) \quad (20)$$

$$\text{var\_sblk} = \frac{1}{64} \sum_{k=1}^{64} (p_k - \bar{p})^2 \quad (21)$$

$$\overline{p} = \frac{1}{64}\sum_{k=1}^{64} p_k \tag{22}$$

In equations (20), (21), and (22), Pk is the original luminance pixel value in the block. In equation (20), a minimum value is employed so that when a macroblock includes a plain part (although the whole of the macroblock is not plain), quantization is performed using a small quantization step value.

Furthermore, the normalized activity $Nact_j$ having a value in the range from 0.5 to 2 is determined in accordance with equation (23) described below.

$$Nact_j = \frac{2 \times act_j + \text{avg\_act}}{act_j + 2 \times \text{avg\_act}} \tag{23}$$

In equation (23), avg_act is the mean value of $act_j$ for coded pictures.

The quantization scale code $mquant_j$ determined taking into account the visual characteristics is given by the following equation (24) using the quantization scale code Qj obtained in step S2.

$$mquant_j = Q_j \times Nact_j \tag{24}$$

In the code size controller 7, the process including steps S1–S3 described above is performed to control the code size so that better image quality is obtained with a smaller code size without causing overflow or underflow in the code buffer 6.

Constraint conditions are imposed upon the code buffer 6, as described below.

The MPEG-2 (ISO/IEC13818-2) standard defines a virtual buffer called VBV (video buffer verifier) for use in a decoder. The code size controller 7 performs assignment of the numbers of bits so that the compressed image information (bit stream) output from the image coding apparatus satisfies the constraint conditions. The VBV buffer is assumed to operate under two ideal conditions. The first ideal condition assumed is that the coding apparatus and the VBV buffer operate in perfect synchronization with each other. The second ideal condition assumed is that decoding of each picture is performed in an instant and data of each picture is taken in an instant out of the VBV buffer. The VBV buffer is defined as an additional ideal model in which compressed image information (bit stream) is treated, and it is not for realizing a practical decoding apparatus.

The VBV buffer is defined to adapt to both constant bit rate (CBR) and variable bit rate (VBR). The constant bit rate is a special case of the variable bit rate.

In order to meet requirements in various applications, two methods are defined as to inputting data to the VBV buffer. The first method is to vary the input rate picture by picture. The second method is to set the input rate to be equal to either the maximum rate or 0 depending on the state of the VBV buffer. In each method, the maximum rate Rmax (bits/sec) is specified by the parameter bit rate described in the sequence header in syntax of MPEG-2 compressed image information. The two methods are distinguished by a variable called vbv_delay defined for each frame.

In the case where vbv_delay of each picture is not equal to the maximum value 0xFFFF, vbv_delay indicates the period of time from the time at which the start code of each picture is input to the VBV buffer to the time at which decoding is started. In this case, the rate of inputting data to the VBV buffer is varied picture by picture. The rate R(n) [bits/sec] at which nth picture data is input to the VBV buffer is given by equation (25) described below.

$$R(n) = d_n^* / \{\tau(n) - \tau(n+1) + t(n+1) - t(n)\} \tag{25}$$

In equation (25), $d_n^*$ is the code size from the start code of the nth picture to the start code of the (n+1)th picture, $\tau(n)$ is the value of variable vbv_delay defined for the nth picture, and t(n) is the time at which the value of the nth picture is taken out of the VBV buffer. The constant bit rate (CBR) data is included in this expression as a special case in which R(n) is constant regardless of n.

Figure 11:
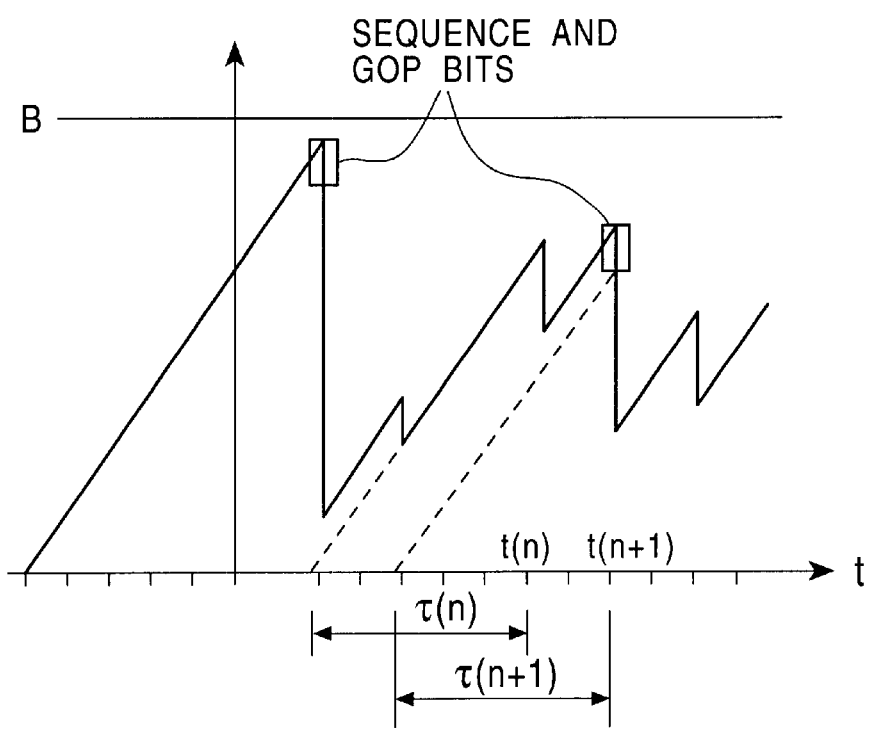
FIG. 11 is a graph illustrating a variation in the bit fullness of a VBV buffer.

FIG. 11 illustrates an example of a variation in bit fullness of the VBV buffer. In the initial state, the bit fullness of the VBV buffer is equal to 0. Decoding is started when a period of time indicated by variable vbv_delay has elapsed since the start code of the first picture was input to the VBV buffer. Thereafter, decoding of the respective pictures and verification of the VBV buffer are performed in predetermined decoding intervals.

In the case where vbv_delay is equal to the maximum value 0xFFFF for all pictures, the rate of inputting data to the VBV buffer is determined by the bit fullness of the VBV buffer. When the VBV buffer has a remaining available space, the data input rate becomes equal to Rmax, while it becomes equal to 0 if no available space remains.

In this case, the bit fullness of the VBA buffer is equal to 0 in the initial state, and decoding is started when the buffer becomes full. Thereafter, decoding of the respective pictures and verification of the VBV buffer are performed in predetermined decoding intervals.

The compressed image information (bit stream) is input to the VBV buffer in accordance with the rule described above. The compressed image information (bit stream) input to the VBV buffer is verified as to whether the following two constraint conditions are satisfied. The first condition is that an overflow must not occur in the VBV buffer just before taking picture data in an instant out of the VBV buffer. The second condition is that an underflow must not occur in the VBV buffer immediately after taking the picture data out of the VBV buffer. After the verification, the image information (bit stream) is coded.

The verification as to the second condition described above is performed differently depending upon whether the low delay mode is specified by variable low_delay or not. In the low delay mode, use of B-pictures is forbidden. In this low delay mode, a delay caused by the sorting of pictures in the coding and decoding process is prevented, and skipping of pictures in the coding process is allowed to further reduce the delay through the VBV buffer.

In the non-low delay mode, it is verified that no underflow occurs in the VBV buffer immediately after taking picture data out of the VBV buffer.

In the low delay mode, an underflow is allowed to be occur in the VBV buffer when picture data is tentatively taken out. In this case, the picture data is not actually taken out at that time, but it is verified periodically every two fields whether all picture data has been received, and picture data is taken out when it is detected that all picture data has been received.

Therefore, in any modes including the low delay mode, the data size of an I-picture has to be lower than the VBV buffer size.

Data Structure of MPEG-2 Compressed Image Information

The data structure of MPEG-2 compressed image information (bit stream) coded by the MPEG-2 image information coding apparatus shown in FIG. 1 is described below with reference to FIG. 12.

Figure 12:
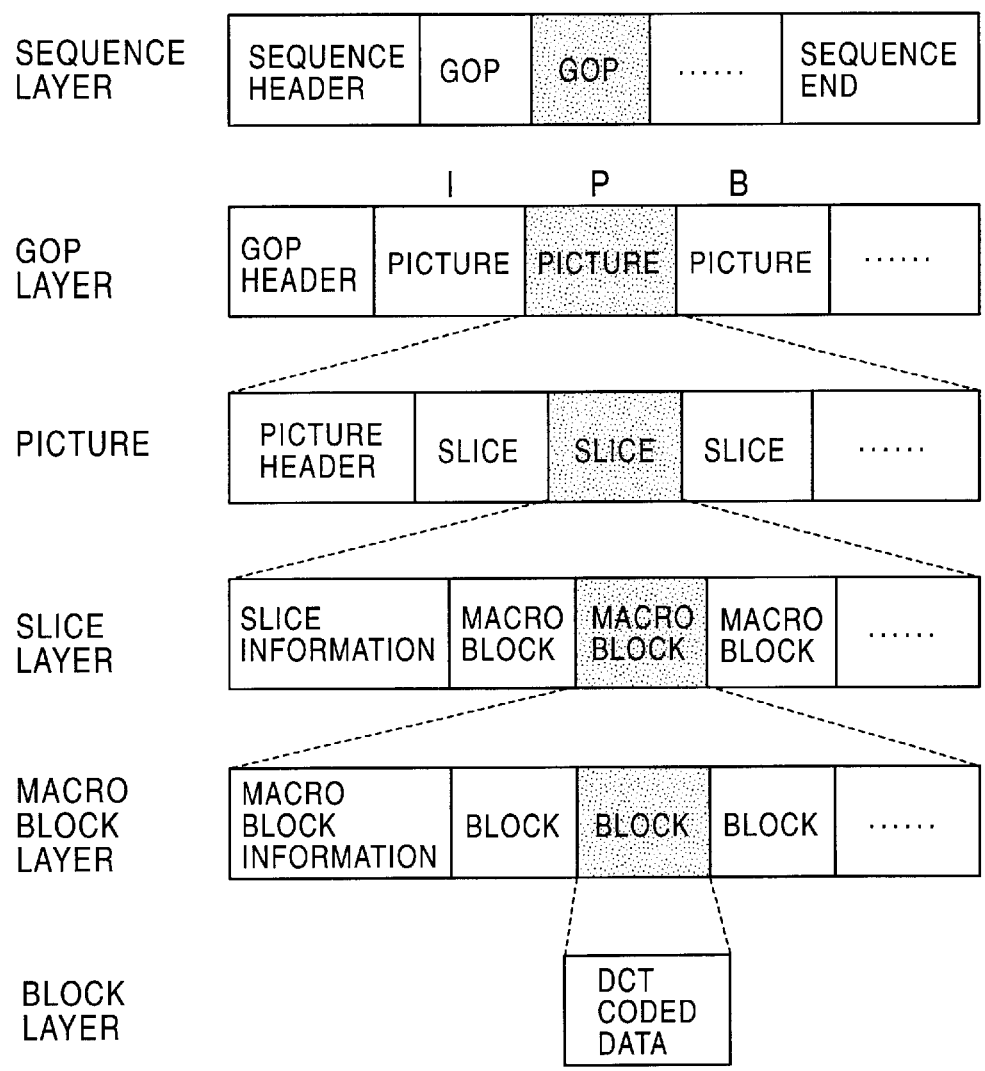
FIG. 12 is a schematic diagram illustrating the hierarchical data structure of MPEG-2 compressed image information (bit stream)

As shown in FIG. 12, image information (bit stream) compressed according to the MPEG-2 standard has a hierarchical structure including, from the top to the bottom, a sequence layer, a GOP (group of pictures) layer, a picture layer, a slice layer, a macroblock layer, and a block layer.

For the respective layers from the sequence layer to the slice layer, a uniquely-defined 8-bit (1-byte) start code (32 bits (4 bytes) in total) is disposed following "0x000001". In the MPEG-2 compressed image information (bit stream), the respective layers are identified by the start code. The start code also serves as an error recovery point. The start code has a code value depending on the layer as shown in FIG. 13.

Figure 14:
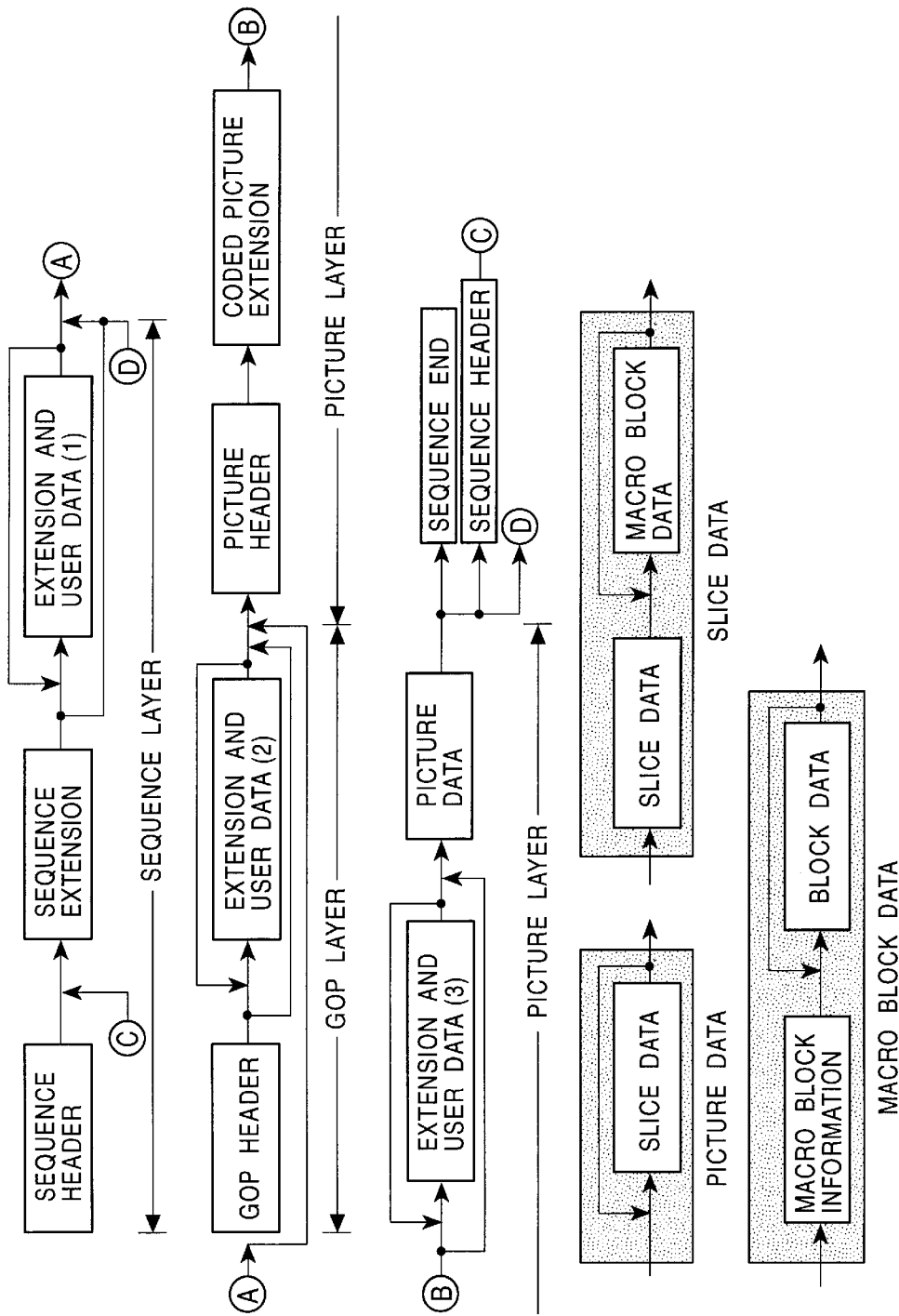
FIG. 14 is a schematic diagram illustrating the block structure of the respective layers of the MPEG-2 compressed image information (bit stream)

With reference to FIG. 14 illustrating the block structures of the respective layers of MPEG-2 compressed image information (bit stream), the data structure of the MPEG-2 compressed image information is described in further detail below.

As shown in FIG. 14, the sequence layer is a top layer of the MPEG-2 compressed image information (bit stream). The sequence layer starts with a sequence header and ends with a sequence end code (sequence_end_code). The sequence layer basically include one or more GOP layers. The sequence layer also includes a sequence extension and extension & user data (1). According to whether the image information includes a sequence extension start code (extension_start_code), it is determined whether the image information (bit stream) is of the MPEG-1 type or MPEG-2 type.

The sequence header includes, as shown in FIG. 15, a sequence header code (sequence_header_code), data indicating the number of pixels in the horizontal direction (horizontal_size_value), data indicating the number of pixels in the vertical direction (vertical_size_value), data indicating pixel aspect ratio (aspect_ratio_information), a frame rate code (frame_rate_code), data indicating the bit rate (bit_rate_value), data indicating the VBV buffer size (vbv_buffer_size_value), an intra macroblock quantization matrix (intra_quantiser_matrix[64]), and an inter macroblock quantization matrix (non_intra_quantiser_matrix[64]). These data are defined for each sequence.

In the sequence extension, as shown in FIG. 16, the following data are described after the sequence extension start code (extension_start_code): data indicating the profile and level used in MPEG-2 (profile_and_level_indication); a progressive scanning image flag (progressive_sequence) for the entire sequence; a chrominance format (chroma_format); data specifying the low delay mode (low_delay); and additional data for extending, to values for MPEG-2, the maximum limits described in the sequence header in terms of the number of pixels and the data size (bit rate) which are common with MPEG-1.

The extension & user data (1) includes, as shown in FIG. 17, extension data (1) (extension_data(1)), a sequence display extension (sequence_display-extension( )), a sequence scalable extension (sequence_scalable_extension( )), a sequence scalable extension identifier (extension_start_code_identifier), data indicating the scalability mode (scalable_mode), and a scalable layer identifier (layer_id). The sequence display extension (sequence_display_extension( )) includes data indicating the RGB conversion characteristic of an original signal, data indicating the image display size, and other data. The sequence scalable extension (sequence_scalable_extension( )) describes data specifying the scalability mode (spatial, SNR, temporal, data partition) and the scalability layer. The extension & user data (1) also includes following variables depending on whether the scalability mode is the spatial scalability mode of the temporal scalability mode. In the case of the spatial scalability mode, the extension & user data (1) includes data indicating the horizontal size of the lower prediction layer (lower_layer_prediction_horizontal_size), data indicating the vertical size of the lower prediction layer (lower_layer_prediction_vertical_size), and data indicating the divisor in the vertical subsampling (vertical_subsampling_factor_n). In the case of the temporal scalability mode, the extension & user data (1) includes the number of additional layer images before the first base layer image (picture_mux_order), the number of additional layer images between base layers (picture_mux_factor), user data ( ) (user_data( )), and user data (user_data). In the user data ( ) (user_data( )), it is allowed to freely describe user data in the sequence level.

The GOP layer is located below the sequence layer, as shown in FIG. 14. The GOP layer begins with a GOP header and includes extension & user data (2) and one or more picture layers. The first picture in the GOP layer must be an I-picture which is coded independently (intra coded) without using a reference picture. Therefore, the first picture in the GOP layer is used as an entry point in random access. For example, in the case of video data with of 30 frames/sec, if each GOP includes 10 to 15 pictures, a random access point appears every 0.3–0.5 sec. Because there is no limitation in the length of GOPs, it is possible to start or end a GOP at a point where a scene changes, thereby increasing the coding efficiency. I-pictures need a very large code size and a large buffer size. In the MPEG-2 standard, to avoid the above problem, it is allowed to remove GOP layers. This makes it possible to employ the MPEG-2 standard in communication which require a low delay or in other similar applications. In this case, for example, slices which are coded by means of intra frame coding (hereinafter, such a slice will be referred to as an intra slice) may be used, and intra coded data of the respective slices may be provided over a plurality of pictures so as to create pictures serving as substitutes for I-pictures. This results in a reduction in the average fullness of the buffer for any picture.

As shown in FIG. 18, the GOP header includes a GOP in header start code (group_start_code) and also includes, following that, a time code (time_code), a flag indicating the independence of the GOP (closed_gop), and a flag indicating the validity of B-pictures before an I-picture in the GOP (broken_link). This flag indicating the validity of B-pictures before an I-picture in the GOP (broken_link) is set to indicate that B-pictures located before the first I-picture in the GOP cannot be decoded correctly. This can occur, for example, when a previous GOP is removed in an editing operation or the like. On the other hand, the flag indicating the independence of the GOP (closed_gop) is set, when the present GOP is not dependent upon a picture in any other GOP. These flags are used to prevent an invalid B-picture from being displayed in random access, and they are also used when a GOP is removed in an editing operation.

Extension & user data (2) includes, as shown in FIG. 19, an extension (2) (extension_data(2)), user data ( ) (user_data( )), and user data (user_data). The extension & user data (2) is used to describe user data in the GOP level.

The picture layer corresponding to a picture is located below the GOP layer as shown in FIG. 14. The picture layer includes a picture header, a picture coding extension, an extension & user data (3), and picture data. As shown in FIG. 12, the picture layer is divided into one or more slice layers.

The picture header includes, as shown in FIG. 20, a picture start code (picture_start_code), data indicating a temporal reference (temporal_reference), data indicating the picture coding type (picture_coding_type), and data indicating a VBV delay before starting the coding (vbv_delay). The picture number of the present picture in the GOP is described in temporal_reference so as to indicate when it is to be displayed. The initial value thereof is reset to 0 for each GOP. The picture coding type data (picture_coding_type) is used to indicate the picture type (I-picture, P-picture, B-picture) for each picture. The VBV delay data (vbv_delay) indicates the delay before the VBV buffer starts the decoding operation.

The picture coding extension includes, as shown in FIG. 21, data indicating the motion vector range (f_code[s][t]), data indicating the precision of DC coefficients of intra macroblocks (intra_dc_precison), data indicating the picture structure (picture_structure), data specifying the manner of displaying fields (top_field_first), a frame prediction and frame DCT flag (frame_pred_frame_dct), a concealment motion vector flag (concealment_motion_vector) for intra macroblocks, data indicating the quantization scale type (q_scale_type), data indicating the intra macroblock variable length coding type (intra_vlc_format), data indicating the scanning type (alternate_scan), 2:3 pull-down field repeating data (repeat_first_field), data indicating 420 type (chroma_420_type), and a progressive scanning flag (progressive_frame). The motion vector range data (f_code[s][t]) describes the ranges of the motion vector in the front-to-back direction, in the horizontal direction, and in the vertical direction. The picture structure data (picture_structure) specifies whether the coding/decoding is performed on a field-by-field basis (such a picture is said to have a field structure) or on a frame-by-frame basis (such a picture is said to have a frame structure). The intra macroblock variable length coding type data (intra_vlc_format) specifies the linear/nonlinear quantization scale. The scanning type data (alternate_scan) specifies the mode as to the variable length coding for the present picture (alternate scanning, zigzag scanning).

The extension & user data (3) includes, as shown in FIG. 22, extension data (3) (extension_data(3)), a quantization matrix extension ( ) (quant_matrix_extension( )), an intra macroblock quantization matrix (intra_quantiser_matrix[64]), an inter macroblock quantization matrix (non_intra_quantiser_matrix[64]), a color difference intra macroblock quantization matrix (chroma_intra_quantiser_matrix[64]), a color difference inter macroblock quantization matrix (chroma_inter_quantiser_matrix[64]), a copyright extension ( ) (copyright_extension( )), a picture display extension ( ) (picture_display_extension( )), a picture spatial scalable extension ( ) (picture_spatial_scalable_extention( )), a spatial weighting factor table for up sampling (spatial_temporal_weight_code_table_index), a lower layer progressive scanning frame flag (lower_layer_progressive_frame), lower layer field selection data (lower_layer_deinterlaced_field_select), a picture temporal scalable extension ( ) (picture_temporal_scalable_extention( )), a reference picture selection code (reference_select_code), data indicating the picture number of a lower layer picture used for forward prediction (forward_temporal_reference), data indicating the picture number of a lower layer picture used for backward prediction (backward_temporal_reference), user data ( ) (user_data( )), and user data (user_data).

The quantization matrix extension ( ) (quant_matrix_extension( )) describes the quantization matrix. Using the quantization matrix extension ( ), it is possible to select a suitable quantization matrix for intra and inter blocks and for luminance and color difference blocks picture by picture, thereby ensuring that quantization is performed in an optimum manner depending upon a scene. The copyright extension ( ) (copyright_extensions( )) describes the copyright number. The picture display extension ( ) (picture_display_extension( )) specifies the display area. Using this picture display extension ( ), when, for example a 16:9 high-resolution (HDTV) image is decoded, it is possible to realize a pan-and-scan capability whereby a particular part of interest of the image is specified and that part is displayed on a normal-resolution television. The picture spatial scalable extension ( ) (picture_spatial_scalable_extention( )) and the picture temporal scalable extension ( ) (picture_temporal_scalable_extention( )) are used to specify the picture number of a lower layer picture used to predict an upper layer picture.

Figures 23, 24:
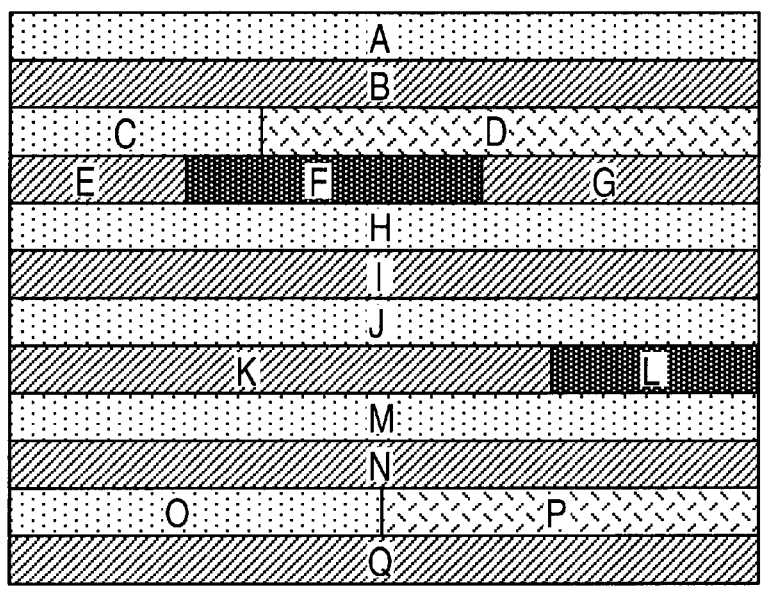
FIG. 23 is a schematic diagram illustrating a slice layer divided within a frame.
FIG. 24 is a table illustrating slice data which defines the slice layer.

The slice layer is located below the picture layer, as shown in FIG. 14. As shown in FIG. 23, the slice layer includes horizontally-extending band-shaped areas (denoted by A, B, C, . . . , Q in FIG. 23) which are parts of a picture. The slice layer is described in the slice data as shown in FIG. 24. If a picture is formed using a plurality of slice layers, when an error occurs in a certain slice layer, it becomes possible to recover from the error in synchronization with the start code (slice_start_code) of the next slice layer. Each slice layer includes one or more macroblocks arranged from left to right and from the top to the bottom in the raster scan order. There is no limitation in terms of the start positions of slice layers, and the start positions may be varied picture by picture. However, in order to make it possible to process slices in parallel and also in order to achieve high error resistance, any slice is allowed to extend only to the right and it is not allowed to extend downward.

The slice data includes, as shown in FIG. 25, a slice layer start code (slice_start_code), extension data indicating the vertical position of the slice (slice_vertical_position_extension), data indicating the data partition point (priority_breakpoint), a quantization scale code (quantiser_scale_code), an intra slice flag (intra_slice), and a macroblock data (macroblock( )). In the slice layer start code (slice_start_code) and the slice vertical position extension data (slice_vertical_position_extension), the vertical start position of the slice is described. On the other hand, quantiser_scale_code is used to describe the quantization scale code shown in FIG. 9. The intra slice flag (intra_slice) indicates whether macroblocks in the slice are all intra macroblocks.

The macroblock layer is located below the slice layer, as shown in FIG. 14. The macroblock layer includes macroblock data and block data.

Macroblock data includes, as shown in FIG. 26, macroblock address extension data (macroblock_escape), data indicating the difference between previous and current macroblock addresses (macroblock_address_increment), macroblock mode data (macroblock_modes( )), data indicating the macroblock coding type (macroblock_type), an up-sampling spatial/temporal weighting code (spatial_temporal_weight_code), data indicating frame structure motion compensation type (frame_motion_type), data indicating field structure motion compensation type (frame_motion_type), data indicating the DCT type (dct_type), a macroblock quantization scale code (quantiser_scale_code), motion vectors (s) (motion_vectors[s]), data indicating a prediction reference field (motion_vertical_field_select[r][s]), motion vectors (r, s) (motion_vectors[s][r]), a basic differential motion vector (motion_code[r][s]

[t]), a residual vector (motion_residual[r][s][t]), a dual prime difference vector (dmvector[t]), CBP (coded_block_pattern), and block data (block(i)).

In the data indicating the difference between previous and current macroblock addresses (macroblock_address_increment), the location of the current macroblock (macroblock_address) is described by the difference relative to the location of the immediately previous macroblock (previous_macroblock_address). In the case where the data indicating the difference between previous and current macroblock addresses (macroblock_address_increment) is greater than 1, macroblocks between the current macroblocks and the immediately previous coded macroblock become skipped macroblocks, and the compressed image information (bit stream) does not include coded information such as a motion vector and discrete cosine transform coefficients for these skipped macroblocks. A macroblock of a P-picture becomes a skipped macroblock, if motion vectors are 0 in both horizontal and vertical directions and if discrete cosine transform coefficients are all 0. In the case of a macroblock of a B-picture, if the motion compensation prediction mode (forward, backward, bidirectional) and the motion vector are the same as those of the immediately previous macroblock, and if discrete cosine transform coefficients are all 0, then that macroblock becomes a skipped macroblock. In the MPEG-2 standard, skipped macroblocks are introduced to eliminate unnecessary macroblocks thereby reducing the amount of data. There is no skipped macroblock for I-pictures. In P- and B-pictures, macroblocks at the first and last positions of a slice cannot be skipped macroblocks and are coded without being skipped.

The macroblock coding type data (macroblock_type) describes the motion compensation prediction mode and the discrete cosine transform coefficient coding mode. Although available modes depend upon the picture type, the macroblock coding type data specifies the MC/No_MC selection mode indicating whether the motion vector is 0 (in the case of P-pictures), the direction of the motion compensation prediction (forward direction, backward direction, or both directions for B-pictures), the Coded/Not_Coded selection mode (indicating whether there are discrete cosine transform coefficients), the intra frame coding type and the quantization scale code.

The frame structure motion compensation type data (frame_motion_type) and the field structure motion compensation type data (frame_motion_type) are used to specify whether motion compensation is performed on a field-by-field basis or a frame-by-frame basis. The mode in which motion compensation is performed on a field-by-field basis is referred to as the field motion compensation mode, and the mode in which motion compensation is performed on a frame-by-frame basis is referred to as the frame motion compensation mode.

The motion vectors (s) (motion_vectors[s]) describe motion vectors. The up-sampling spatial/temporal weighting code (spatial_temporal_weight_code) describes spatial/temporal weighting factors used in prediction of an upper layer by means of up-sampling a lower layer. The macroblock quantization scale code (quantiser_scale_code) describes the quantization scale size for each macroblock. As described earlier, the quantization scale is controlled by the code size controller 7.

The block layer is located below the macroblock layer as shown in FIG. 14. The block layer includes block data (block(i)) describing quantized discrete cosine transform coefficients. The block data (block(i)) describes a luminance signal or a color difference signal for 8 lines×8 pixels, wherein the discrete cosine transform and the inverse discrete cosine transform are performed for those blocks described by block(i) on a block-by-block basis.

As shown in FIG. 27, the block data includes data indicating DCT luminance DC coefficient difference size (dct_dc_size_luminance), data indicating DCT luminance DC coefficient difference value (dct_dc_differential), data indicating DCT color-difference DC coefficient difference size (dct_dc_size_chrominance), data indicating DCT color-difference DC coefficient difference value (dct_dc_differential), first non-zero coefficients of inter blocks (First_DCT_coefficients), subsequent DCT coefficients (Subsequent_DCT_coefficients), and a flag indicating the end of DCT coefficients of each block (End_of_Block).

The DCT luminance DC coefficient difference size data (dct_dc_size_luminance) describes the size of the difference between the DC component coefficient of the luminance component of an intra macroblock and that of an adjacent block. The DCT luminance DC coefficient difference value data (dct_dc_differential) describes the difference between the DC component coefficient of the luminance component of an intra macroblock and that of an adjacent block. The DCT color-difference DC coefficient difference size data (dct_dc_size_chrominance) describes the size of the difference between the DC component coefficient of the color-difference component of an intra macroblock and that of an adjacent block. The DCT color-difference DC coefficient difference value data (dct_dc_differential) describes the difference between the DC component coefficient of the difference-difference component of an intra macroblock and that of an adjacent block the data First_DCT_coefficients describes the number of zero coefficients located before the first non-zero quantized discrete cosine transform coefficient of an inter macroblock (hereinafter, such the number is referred to as the run length). The subsequent DCT coefficients data (Subsequent_DCT_coefficients) describes the size of non-zero coefficients of the inter macroblock. The flag End_of_Block indicates the end of discrete cosine transform coefficients of each block.

The MPEG-2 compressed image information (bit stream) having the above data structure is generated by the MPEG-2 image information coding apparatus by means of coding and transmitted to a device such as a decoding apparatus.

First Embodiment of an Image Information Conversion Apparatus

Now, a first embodiment of an image information conversion apparatus according to the present invention is described below.

Figure 28:
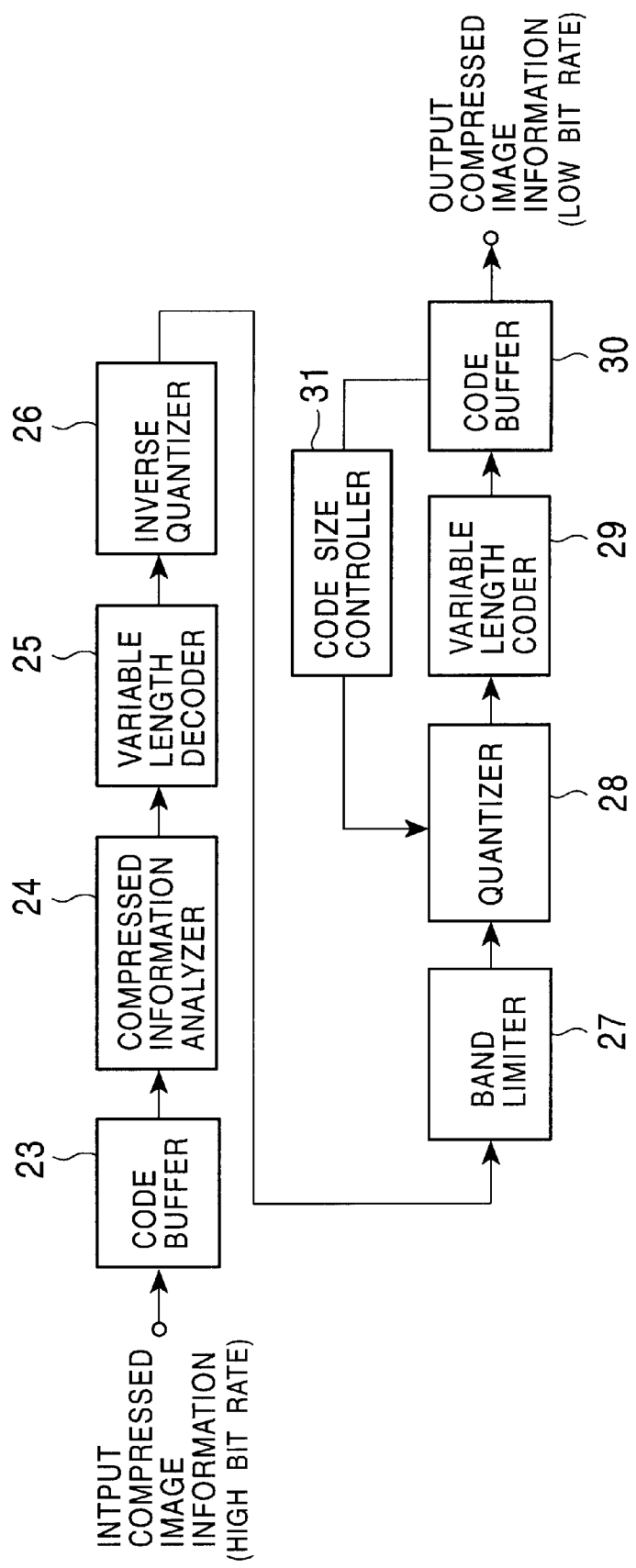
FIG. 28 is a block diagram illustrating a first embodiment of an image information conversion apparatus according to the present invention.

FIG. 28 is a block diagram of the first embodiment of the image information conversion apparatus according to the present invention. This image information conversion apparatus reduces the code size (bit rate) of given image information (bit stream) compressed according to the MPEG-2 standard and outputs the resultant compressed image information with a lower bit rate.

The image information conversion apparatus 20 shown in FIG. 28 includes a code buffer 23, a compressed image analyzer 24, a variable length decoder 25, an inverse quantizer 26, a band limiter 27, a quantizer 28, a variable length coder 29, a coder buffer 30, and a code size controller 31.

Compressed image information (bit stream) with a large code size (high bit rate) is input to the code buffer 23. Because the compressed image information (bit stream) has been coded such that the above-described constraint conditions associated with the VBV buffer are satisfied, the code buffer 23 does not encounter overflowing or underflowing. The compressed image information (bit stream) is then transferred from the code buffer 23 to the compressed information analyzer 24.

The compressed information analyzer 24 extracts information from the compressed image information (bit stream) in accordance with an MPEG-2 syntax such as those shown in FIGS. 15–27. The extracted information is sent to the variable length decoder 25 and devices following it.

First, the variable length decoder 25 treats the DC component of an intra macroblock such that the difference in the DC component between that intra macroblock and the adjacent block is decoded by means of variable length decoding. For the other coefficients, the data coded by the run and the level is decoded by means of variable length decoding thereby detecting the original quantized one-dimensional discrete cosine transform coefficients. Thereafter, in accordance with information as to the scanning method (zigzag scanning, or alternate scanning) extracted by the compressed information analyzer 24, the variable length decoder 25 performs inverse scanning upon the one-dimensional array of discrete cosine transform coefficients so as to re-arrange the quantized discrete cosine transform coefficients into a two-dimensional array. The obtained two-dimensional array of quantized discrete cosine transform coefficients is sent to the inverse quantizer 26.

In accordance with information, extracted by the compressed information analyzer 24, as to the quantization step value and the quantization matrix, the inverse quantizer 26 dequantizes the quantized discrete cosine transform coefficients. The resultant dequantized discrete cosine transform coefficients are sent to the band limiter 27.

Upon reception of the discrete cosine transform coefficients from the inverse quantizer 26, the band limiter 27 limits the band of the high-frequency component coefficients to a particular range for each DCT block.

Figure 29A:
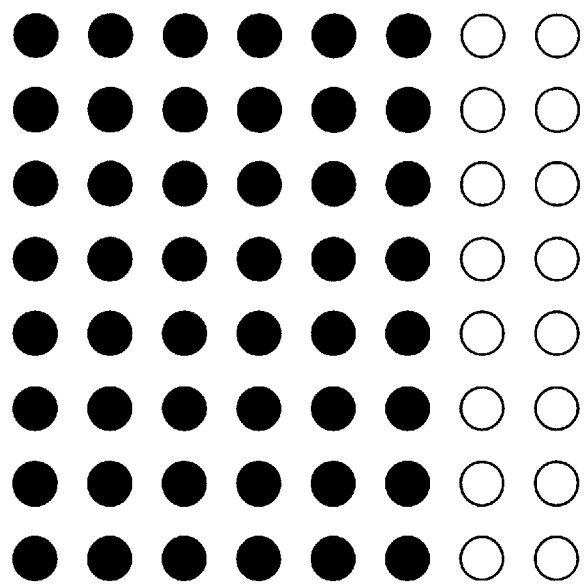
FIG. 29A illustrates an example of a band limitation for discrete cosine transform coefficients of a luminance signal.
Figure 29B:
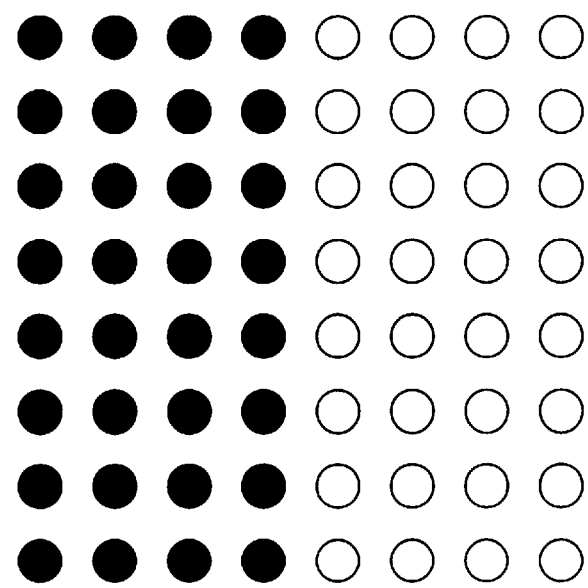
FIG. 29B illustrates an example of a band limitation for discrete cosine transform coefficients of a color difference signal.

FIG. 29 illustrates an example of the process performed by the band limiter to limit the high-frequency band components in the horizontal direction. In this specific example, the band limiter 27 process the luminance signal such that 6×8 low-frequency coefficients, in the horizontal direction, of the 8×8 discrete cosine transform coefficients are preserved, and the other coefficients are replaced with 0, as shown in FIG. 29A. As for the color-difference signal, 4×8 low-frequency coefficients, in the horizontal direction, of the 8×8 discrete cosine transform coefficients are preserved, and the other coefficients are replaced with 0, as shown in FIG. 29B.

By limiting the band of high-frequency components of the discrete cosine transform coefficients in the above-described manner, the code size (bit rate) in the frequency domain is reduced.

In the case where the given compressed image information (bit stream) is of the interlaced scanning type, high-frequency components of the discrete cosine transform coefficients include information as to the time difference between fields. Therefore, if band limitation is performed upon the discrete cosine transform coefficients in the vertical direction, a large degree of degradation occurs in image quality. To avoid the above problem, the band limiter 27 does not limit the band in the vertical direction.

The band limiter 27 eliminates components over a greater range for a color difference signal than for a luminance signal, because the elimination of such a component of the color difference signal is less perceptible to human eyes than the luminance signal. By limiting the band in the above-described manner using the band limiter 27, it becomes possible to reduce re-quantization distortion without causing significant degradation in image quality. When the code size (bit rate) to be reduced is small or when there is a limitation caused by the circuit, the band may be limited over the same range for both luminance and color difference signals.

In the band limiter 27, the manner of limiting the band of the discrete cosine coefficients is not limited to replacement of particular coefficients with 0. For example, instead of replacement with 0, the high-frequency components of discrete cosine transform coefficients in the horizontal direction may be multiplied by predetermined weighting factors so as to reduce the code size (bit rate).

After being limited in terms of band by the band limiter 27, the discrete cosine transform coefficients are applied to the quantizer 28.

The quantizer 28 quantizes the 8×8 discrete cosine transform coefficients received from the band limiter 27. Herein, the quantization step value employed by the quantizer 28 is controlled by the code size controller 31 as described below. As for the quantization matrix used herein in the quantization process, the quantization matrix which was used to code the input image information (bit steam) may be employed or a quantization matrix which is more suitable for the re-quantization process may be newly generated.

The method of controlling the quantization step value using the code size controller 31 is described below.

As described earlier with reference to FIG. 10, in the technique described in the MPEG-2 Test Model 5 (ISO/IEC JTC1/SC29/WG11 N0400) employed in the MPEG-2 image information coding apparatus, the target code size (target bit rate) is first calculated for each picture in accordance with information as to pictures (I-, P-, and B-pictures) of a GOP, and then coding is performed. However, in the present embodiment of the image information conversion apparatus 20, data is given as compressed image information (bit stream), and thus it is impossible to detect GOP information from the header information. Therefore, the technique described in the MPEG-2 Test Model 5 cannot be applied directly to the present image information conversion apparatus 20.

In the image information conversion apparatus 20, in view of the above, the code size assigned to an I-picture is first analyzed by the compressed image analyzer 24, as shown in FIG. 30 (step S11). The information indicating the code size assigned to the I-picture is sent to the code size controller 31. The code size controller 31 determines the target code size (target bet rate) T of the current picture, using the code size ($B_1$) given by the compressed image analyzer 24, the bit rate $R_1$ of the input bit stream, and the bit rate $R_2$ of the output bit stream, in accordance with equation (26) described below (step S12).

$$T = B_1 \times \frac{R_2}{R_1} \tag{26}$$

$R_1$ and $R_2$ can be extracted by analyzing information described in the sequence header shown in FIG. 15.

Furthermore, the code size controller 31 performs the same process as steps S1, S2, and S3 shown in FIG. 10.

As described above, the image information conversion apparatus 20 first analyzes the code size assigned to the I-picture, and multiplies it by the ratio of the bit rate of the output compressed image information to that of the input compressed image information whereby the code size is controlled by the method described in the MPEG-2 Test Model 5 without needing information as to the GOP.

Furthermore, the code size controller 31 also assigns the quantization step value to each macroblock such that the code buffer 30 satisfies the above-described constraint conditions as to the VBV buffer.

The discrete cosine transform coefficients re-quantized in the above-described manner are then sent from the quantizer 28 to the variable length coder 29.

The variable length coder 29 performs variable length coding upon the quantized discrete cosine transform coefficients such that the average code length is minimized. In this process, for the DC components of the discrete cosine transform coefficients, the variable length coder 29 employs the DC components of the immediately previous block as predicted values and codes the difference between the DC components of the current block and the predicted values. For the other components, the variable length coder 29 rearranges the coefficients into a one-dimensional array in accordance with a predetermined scanning method (zigzag scanning method or alternate scanning method), and the variable length coder 29 codes the rearranged coefficients by employing, as an event, each pair of the number of successive zero coefficients (run) and successive non-zero coefficients (level). When a DCT block is scanned, if the scanning point has reached a point the coefficients following which are all zero, the quantizer 4 outputs a code called EOB (end of block), and thus the variable length coding for that block is completed.

The variable length coder 29 may arrange the discrete cosine transform coefficients into a one-dimensional data array by means of the alternate scanning method regardless of the scanning method of the input compressed image information with a large code size (high bit rate). This provides the following advantage.

Figure 31A:
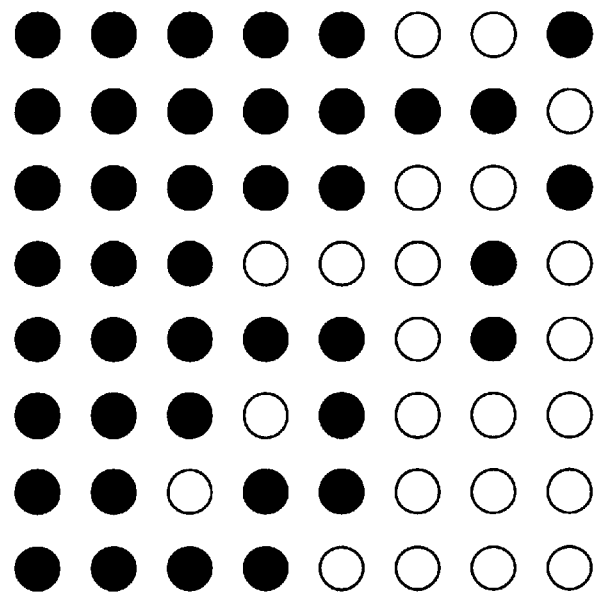
FIG. 31A illustrates discrete cosine transform coefficients before being subjected to band limitation.
Figure 31B:
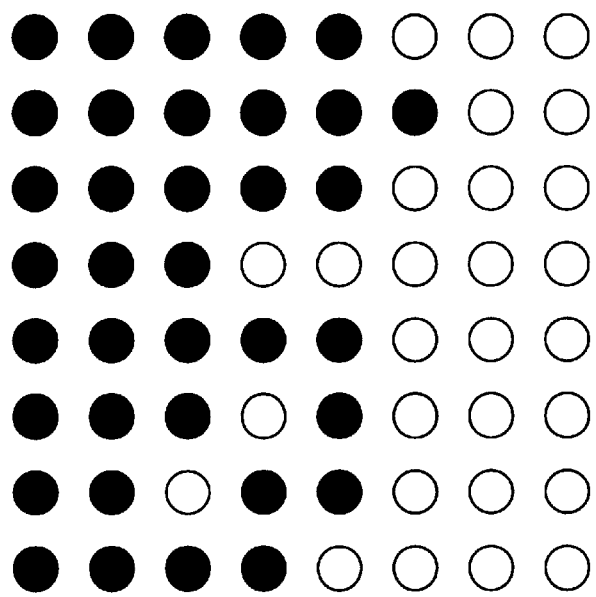
FIG. 31B illustrates discrete cosine transform coefficients after being subjected to band limitation.

Herein, let us assume that the discrete cosine transform coefficients of a certain block of input compressed image information (bit stream) are such as those shown in FIG. 31A. In FIG. 31, solid circuits denote non-zero coefficients, and open circles denote zero coefficients. Herein, if high-frequency components of the discrete cosine transform coefficients in the horizontal direction are replaced with 0, then the distribution of the non-zero coefficients becomes as shown in FIG. 31B. After replacing the high-frequency components in the horizontal direction with zero as shown in FIG. 31B, if the resultant discrete cosine transform coefficients are re-coded by means of the zigzag scanning, then the last non-zero coefficient has a scan number equal to 50 (refer to FIG. 6A). In contrast, if the scanning conversion is performed and the coefficients are coded by means of the alternate scanning method, the last non-zero coefficient has a scan number equal to 44 (refer to FIG. 6B). As can be seen from the above discussion, if the alternate scanning method is employed to perform variable length coding upon the discrete cosine transform coefficients whose high-frequency components in the horizontal direction have been replaced with 0, the EOB data has a smaller scan number than obtained by the zigzag scanning method. Therefore, it becomes possible to employ a smaller quantization step value, which results in a reduction in quantization distortion caused by the re-quantization.

The discrete cosine transform coefficients which have been variable length coded by the variable length coder 29 are sent to the code buffer 30. After being stored temporarily in the code buffer 30, the coded discrete cosine transform coefficients are converted into a bit stream structure and output as compressed image information.

In the image information conversion apparatus 20 according to the first embodiment of the present invention, as described above, it is possible to reduce the code size (bit rate) by treating the data in each block in the frequency domain, and thus the amount of calculation becomes small compared with that required by the conventional image information conversion apparatus in which image information is decoded into baseband video data and then coded again. Therefore, it is possible to construct the image information conversion apparatus 20 into a very simple form.

In the above-described image information conversion apparatus 20, the band limiter 27 is disposed between the inverse quantizer 26 and the quantizer 28. However, the band limiter 27 may be removed, if the large reduction in the code size (bit rate) is not required.

Second Embodiment of an Image Information Conversion Apparatus

A second embodiment of an image information conversion apparatus according to the present invention is described below.

Figure 32:
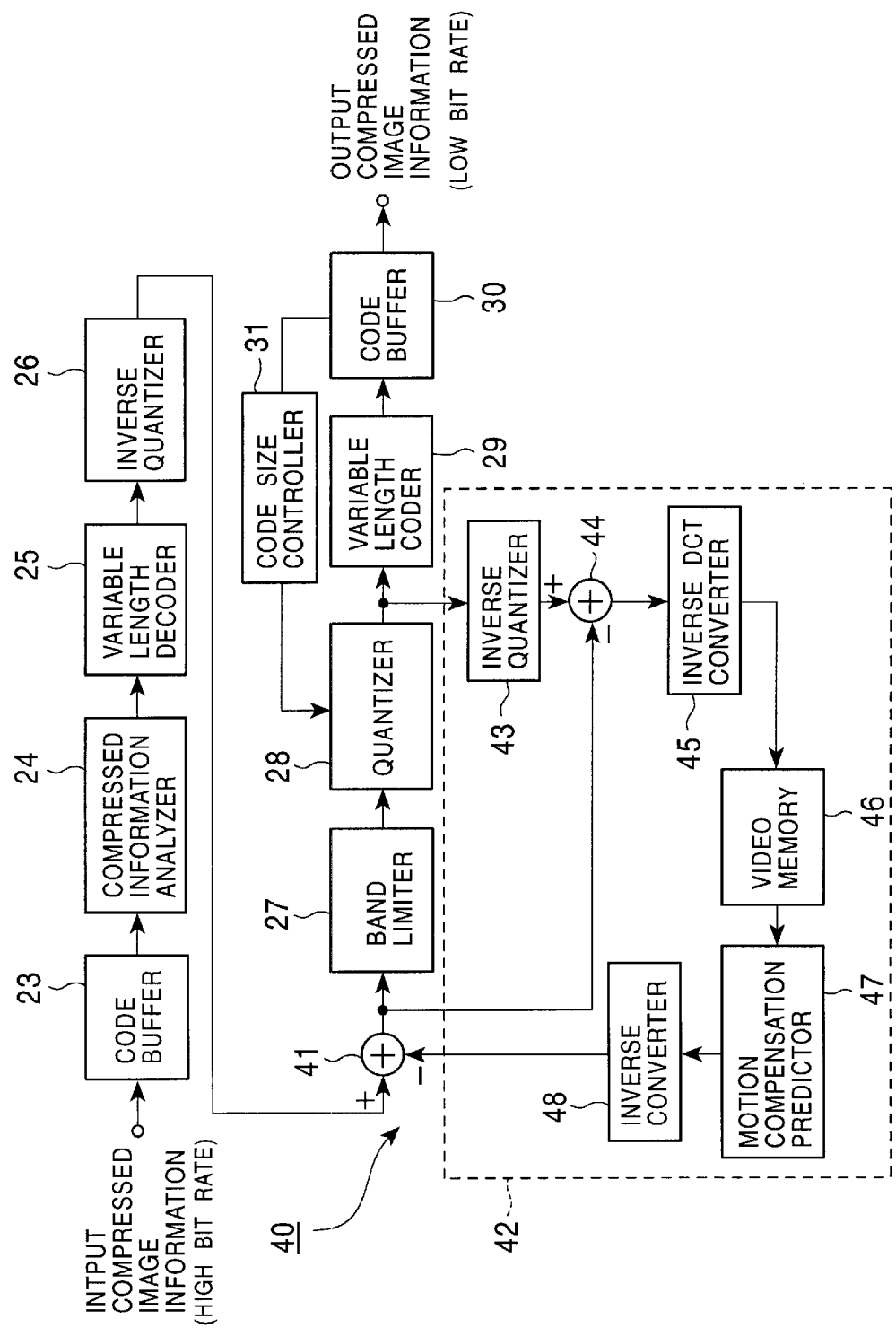
FIG. 32 is a block diagram illustrating a second embodiment of an image information conversion apparatus according to the present invention.

FIG. 32 is a block diagram of the second embodiment of the image information conversion apparatus according to the present invention. In this second embodiment of the image information conversion apparatus, similar elements to those of the first embodiment of the image information conversion apparatus 20 are denoted by similar reference numerals, and they are not described in further detail herein.

The image information conversion apparatus 40 shown in FIG. 32 includes a code buffer 23, a compressed information analyzer 24, a variable length decoder 25, an inverse quantizer 26, an adder 41, a band limiter 27, a quantizer 28, a variable length coder 29, a code buffer 30, a code size controller 31, and a motion compensation error corrector 42.

The adder 41 is disposed between the inverse quantizer 26 and the band limiter 27. The adder 41 subtracts motion compensation error correction coefficients generated by the motion compensation error corrector 42 from discrete cosine transform coefficients obtained via inverse quantization performed by the inverse quantizer 26.

The motion compensation error corrector 42 generates motion compensation error correction coefficients used to correct motion compensation errors which occur when the quantizer 28 re-quantizes the discrete cosine transform coefficients obtained via the inverse quantization performed by the inverse quantizer 26.

The cause of the motion compensation error is discussed below.

Herein, we represent the pixel value of an original picture by O, the quantization step value for the pixel value O of the original picture of the input compressed image information (bit stream) with the large code size (high bit rate) by $Q_1$, and the quantization step value for the pixel value O of the original picture of the recoded compressed image information (bit stream) with the small code size (low bit rate) by $Q_2$. Furthermore, the pixel values of a reference picture dequantized by the quantization step values $Q_1$ and $Q_2$ are represented by $L(Q_1)$ and $L(Q_2)$, respectively.

When pixels of inter macroblocks are coded, the differential value $O-L(Q_1)$ is calculated by, for example, the adder 2 of the MPEG-2 image information coding apparatus shown in FIG. 1, and then the discrete cosine transform is performed upon the differential value O–L(Q$_1$). In the decoding process for the inter macroblock pixels coded in the above-described manner, the inverse discrete cosine transform is performed upon the coded differential value O–L(Q$_1$). Thereafter, the reference picture L(Q$_1$) generated by means of motion compensation is subtracted from the differential value O–L(Q$_1$) thereby reproducing the pixel value O of the original image.

On the other hand, for pixels of inter macroblocks, when the code size (bit rate) is reduced by the image information conversion apparatus shown in FIG. 28, the inverse quantizer 26 and the quantizer 28 replaces the quantization step value Q$_1$ for the difference value O–L(Q$_1$) with Q$_2$. In the decoding operation, pixels in the inter macroblocks whose code size has been reduced in the above manner are decoded on the assumption that the differential value O–L(Q$_2$) has been coded using the quantization step value Q$_2$.

Because the image information conversion apparatus 20 reduces the code size by performing re-quantization using a different quantization step value, Q$_1$=Q2 does not hold. As a result, quantization errors occur during the decoding process for inter macroblocks. Thus, motion compensation errors occur in coded P-pictures and B-pictures in inter macroblocks.

Errors in a P-picture can propagate into another P-picture or a B-picture which is generated using the former P-picture as a reference picture. This can cause further degradation in image quality.

In the motion compensation error corrector 42 of the image information conversion apparatus 40 according to the second embodiment, motion compensation error correction coefficients are generated and subtracted from the discrete cosine transform coefficients dequantized by the inverse quantizer 26 thereby correcting the motion compensation errors.

The motion compensation error corrector 42 is described in further detail below.

The motion compensation error corrector 42 includes an inverse quantizer 43, an adder 44, an inverse DCT converter 45, a video memory 46, a motion compensation predictor 47 and, a DCT converter 48.

The inverse quantizer 43 dequantizes the discrete cosine transform coefficients re-quantized by the quantizer 28, using the same quantization matrix as that used by the quantizer 28. The discrete cosine transform coefficients dequantized by the inverse quantizer 43 are applied to the adder 44.

The adder 44 subtracts the discrete cosine transform coefficients, which have been subtracted via the adder 41 by the motion compensation error correction coefficients, from the discrete cosine transform coefficients dequantized by the inverse dequantizer 43 thereby generating frequency-domain quantization error coefficients. The resultant frequency-domain quantization error coefficients are applied to the-inverse DCT converter 45.

The inverse DCT converter 45 performs an inverse discrete cosine transform upon the frequency-domain quantization error coefficients received from the adder 44. The result obtained via the inverse discrete cosine transform is stored as space-domain quantization errors in the video memory 46.

The motion compensation predictor 47 performs motion compensation upon the space-domain quantization errors stored in the video memory 46, in accordance with the motion compensation prediction mode (field motion compensation prediction mode or frame compensation prediction mode; and forward prediction mode, backward prediction mode, or bi-directional prediction mode) described in the input compressed image information (bit stream) with a large code size (high bit rate) and also in accordance with motion vectors. The resultant data is used as space-domain motion compensation error correction values, which are sent to the DCT converter 48.

The DCT converter 48 generates frequency-domain motion compensation error correction coefficients by performing a discrete cosine transform upon the received space-domain motion compensation error correction values. The resultant motion compensation error correction coefficients are applied to the adder 41.

The adder 41 subtracts the motion compensation error correction coefficients from the discrete cosine transform coefficients dequantized by the inverse quantizer 26, thereby correcting the errors caused by the motion compensation.

In the image information conversion apparatus 40 according to the second embodiment of the present invention, as described above, it is possible to reduce the code size (bit rate) by treating the data in each block in the frequency domain, and thus the amount of calculation becomes small compared with that required by the conventional image information conversion apparatus in which image information is decoded into baseband video data and then coded again. Therefore, it is possible to construct the image information conversion apparatus 40 into a very simple form. Furthermore, the image information conversion apparatus 40 is capable of reduce the code size without generating degradation in image quality caused by the accumulation of motion compensation errors.

A fast algorithm may be applied to the processes performed by the motion compensation error corrector 42, the inverse DCT converter 45, and the DCT converter 48.

Figure 33:
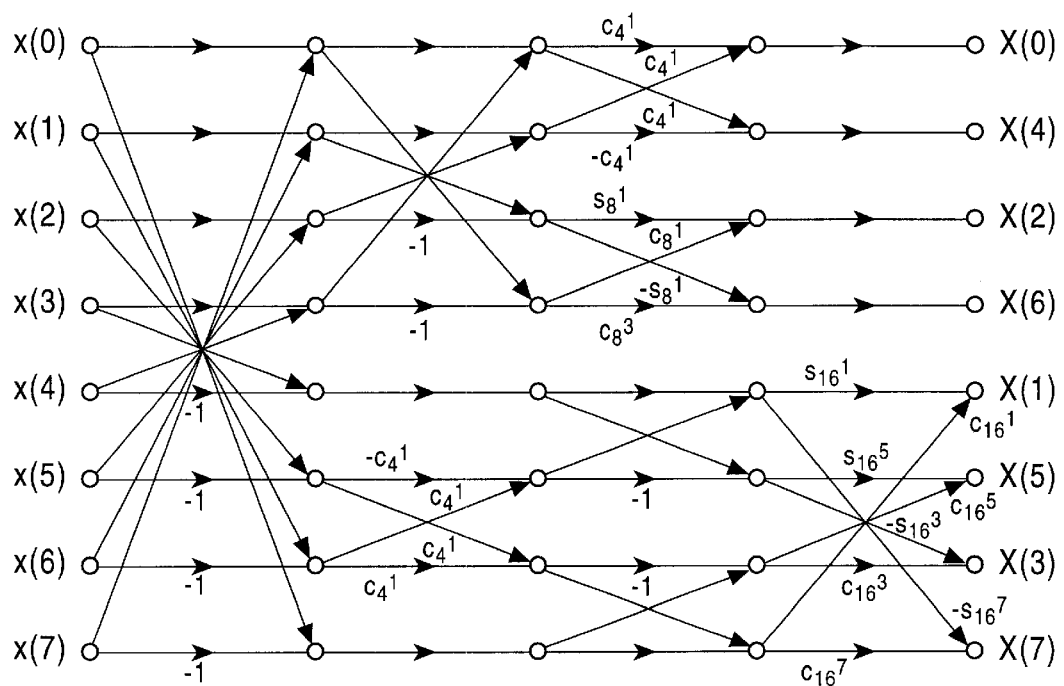
FIG. 33 is a flow chart associated with processed of a discrete cosine transform and inverse discrete cosine transform according to a fast algorithm.

FIG. 33 is a flow chart illustrating the process according to the fast algorithm disclosed in a paper entitled "A fast computational algorithm for the discrete cosine transform" (IEEE Trans. Commun. Vol. 25, No. 9, pp. 1004–1009, 1977).

In this method, the discrete cosine transform is executed by performing the process in the direction (from variables x(0), . . . , x(7) to X(0), . . . , X(7)) denoted by arrows in FIG. 33. If the process is performed in the direction (from variables X(0), . . . , X(7) to x(0), . . . , x(7)) opposite to the direction denoted by the arrows in FIG. 33, the inverse cosine transform is executed. In FIG. 33, $C_l^1$ denotes cos (iπ/l).

In the inverse DCT converter 45 and the DCT converter 48, in the case where high-frequency components of coefficients are replaced with 0 by the band limiter 37, it is possible to skip the inverse cosine transform and the discrete cosine transform for the coefficients replaced with 0. This results in reductions in the circuit scale and the amount of calculation.

Degradation in a color difference signal of a picture is less perceptible to human eyes than degradation in a luminance signal. Therefore, the motion compensation error correction described above may be performed only for the luminance signal without significant degradation in picture quality. This allows large reductions in the circuit scale and the amount of calculation. Errors in P-pictures propagate into B-pictures. However, errors in B-pictures do not propagate further. On the other hand, B-pictures have the bi-directional prediction mode which needs a very large amount of process. In view of the above, the motion compensation error correction may be performed only for P-pictures to achieve great reductions in the circuit scale and the amount of calculation without causing significant degradation in picture quality. Furthermore, the elimination of the process for B-pictures allows a reduction in the capacity of the video memory 46.

In the above embodiments, the input image information is assumed to have been compressed according to the MPEG-2 standard. It is also possible to reduce the code size (bit rate) of image information (bit stream) coded by means of an orthogonal transform and motion compensation.

Third Embodiment of an Image Information Conversion Apparatus

A third embodiment of an image information conversion apparatus according to the present invention is described below.

FIG. 32 is a block diagram of the third embodiment of the image information conversion apparatus according to the present invention. In this third embodiment of the image information conversion apparatus, similar elements to those of the first embodiment of the image information conversion apparatus 20 or to those of the second embodiment of the image information conversion apparatus 40 are denoted by similar reference numerals, and they are not described in further detail herein.

Figure 34:
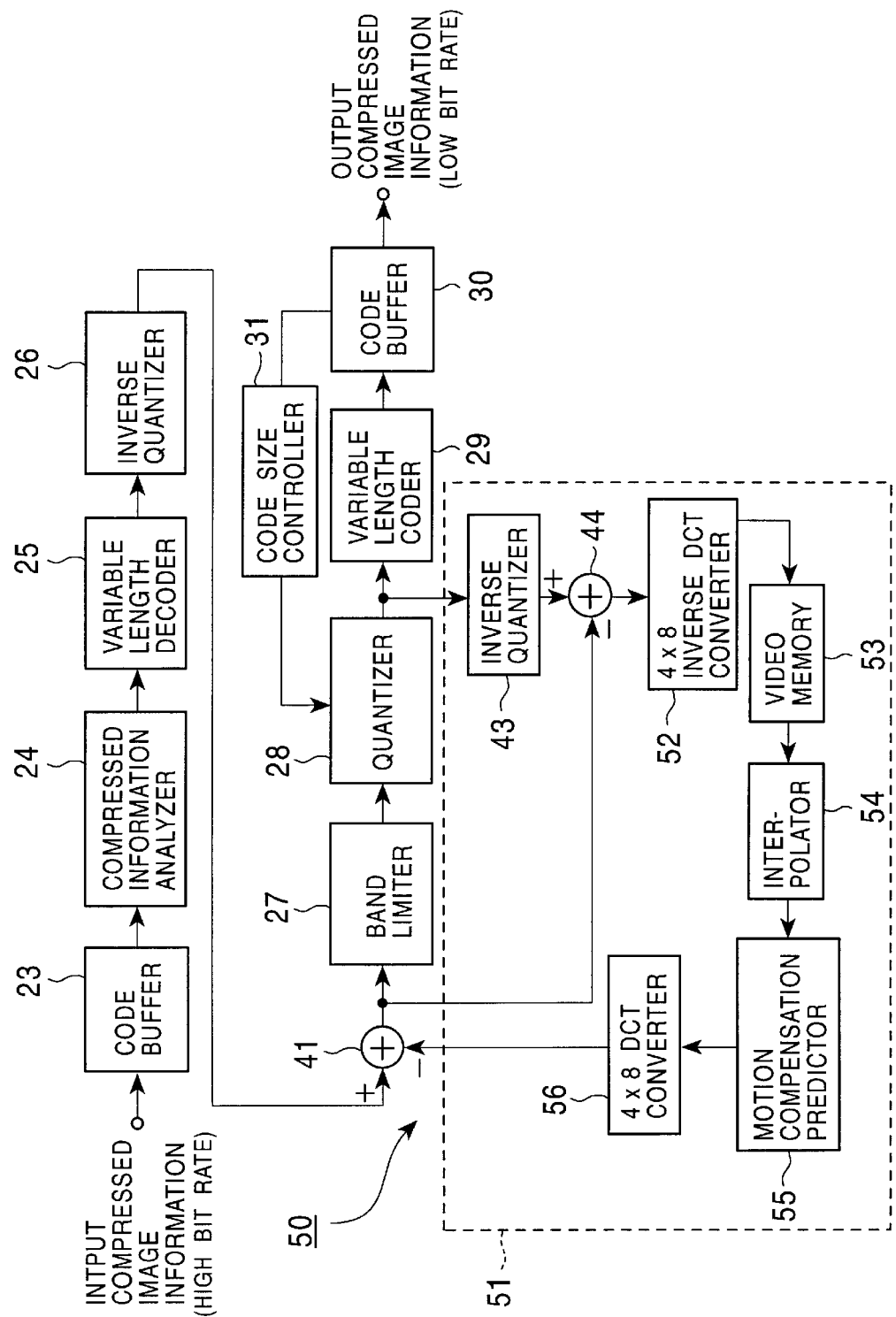
FIG. 34 is a block diagram illustrating a third embodiment of an image information conversion apparatus according to the present invention.

The image information conversion apparatus 50 shown in FIG. 34 includes a code buffer 23, a compressed information analyzer 24, a variable length decoder 25, an inverse quantizer 26, an adder 41, a band limiter 27, a quantizer 28, a variable length coder 29, a code buffer 30, a code size controller 31, and a motion compensation error corrector 51.

The adder 41 is disposed between the inverse quantizer 26 and the band limiter 27. The adder 41 subtracts motion compensation error correction coefficients generated by the motion compensation error corrector 51 from discrete cosine transform coefficients obtained via inverse quantization performed by the inverse quantizer 26.

The motion compensation error corrector 51 generates motion compensation error correction coefficients used to correct motion compensation errors which occur when the quantizer 28 re-quantizes the discrete cosine transform coefficients obtained via the inverse quantization performed by the inverse quantizer 26. Furthermore, the motion compensation error corrector 51 subtracts the motion compensation error correction coefficients from the discrete cosine transform coefficients dequantized by the inverse quantizer 26 thereby correcting the motion compensation errors.

The motion compensation error corrector 51 is described in further detail below.

The motion compensation error corrector 51 includes an inverse quantizer 43, an adder 44, a 4×8 inverse DCT converter 52, a video memory 53, an interpolator 54, a motion compensation predictor 55 and a 4×8 DCT converter 56.

The inverse quantizer 43 dequantizes the discrete cosine transform coefficients re-quantized by the quantizer 28, using the same quantization matrix as that used by the quantizer 28. The discrete cosine transform coefficients dequantized by the inverse quantizer 43 are applied to the adder 44.

The adder 44 subtracts the discrete cosine transform coefficients, which have been subtracted via the adder 41 by the motion compensation error correction coefficients, from the discrete cosine transform coefficients dequantized by the inverse dequantizer 43 thereby generating frequency-domain quantization error coefficients. The resultant frequency-domain quantization error coefficients are applied to the 4×8 inverse DCT converter 52.

The 4×8 inverse DCT converter 52 performs a 4×8 inverse discrete cosine transform upon the quantization error coefficients received from the adder 44 thereby generating 4×8 quantization error values in the space domain. The resultant 4×8 space-domain quantization error values obtained via the inverse discrete cosine transform are stored in the video memory 53.

Because a half of the 4×8 quantization error values in the horizontal direction are removed, the video memory 53 is required to have a capacity capable of storing data with a resolution one-half the resolution of the input compressed image information.

The interpolator 54 interpolates, in the horizontal direction, the 4×8 quantization error values stored in the video memory 53. By interpolating the 4×8 quantization error values in the horizontal direction using the interpolator 54, it becomes possible for the motion compensation predictor 55 located at the following stage to perform motion prediction with precision of ¼ pixels for horizontal information. The interpolator may perform the interpolation by means of linear interpolation or by means of interpolation using a digital filter with several taps such as a half-band filter. The interpolator 54 may generate only necessary values by means of interpolation, depending on the motion vector value.

FIG. 35 illustrates an example of the process of interpolating data in the horizontal direction with precision of ¼ pixels by means of linear interpolation. In the case where motion vectors represent values at the same pixel positions as those of the original pixels, the values of the original pixels are employed as interpolated pixel values, as shown in FIG. 35A. On the other hand, in the case where motion vectors represent values at positions shifted by ¼ pixels relative to the positions of the original pixels as shown in FIG. 35, interpolated pixel values are determined by calculating the sum of two adjacent pixel values multiplied by weighting factors determined the relative distance from the interpolated pixel position to the two adjacent pixels.

The motion compensation predictor 55 performs motion compensation upon the space-domain quantization errors stored in the video memory 53, in accordance with the motion compensation prediction mode (field motion compensation prediction mode or frame compensation prediction mode; and forward prediction mode, backward prediction mode, or bi-directional prediction mode) described in the input compressed image information (bit stream) with a large code size (high bit rate) and also in accordance with motion vectors. In this process, motion compensation is performed with precision of ¼ pixels in the horizontal direction and ½ pixels in the vertical direction using the interpolated values generated by the interpolator 54.

The resultant data is used as 4×8 motion compensation error correction values in the space domain. The 4×8 motion compensation error correction values are applied to the 4×8 DCT converter 56.

The 4×8 DCT converter 56 generates frequency-domain motion compensation error correction coefficients by performing a 4×8 discrete cosine transform upon the received 4×8 motion compensation error correction values. The resultant motion compensation error correction coefficients are applied to the adder 41.

The adder 41 subtracts the motion compensation error correction coefficients from the discrete cosine transform coefficients dequantized by the inverse quantizer 26, thereby correcting the errors caused by the motion compensation.

In the image information conversion apparatus 50, as described above, the compensation error correction is performed for low-frequency components of 8×8 discrete cosine transform coefficients in the horizontal direction and for all components in the vertical direction, and correction is not performed for high-frequency components in the horizontal direction, because errors in the low-frequency components are more significant. Generally, there is a small probability that a large error occurs in high-frequency components in the horizontal direction. Furthermore, high-frequency components in the horizontal direction are removed by the band limiter 27. Therefore, no significant degradation in picture quality occurs even if the error correction for high frequency-components in the horizontal direction is not performed. In contrast, as for components in the vertical direction, when the input compressed image information is generated by means of interlaced scanning, information as to the time difference between fields is contained in high-frequency components. Therefore, it is desirable to perform the motion compensation error correction upon all components in the vertical direction over the entire frequency range.

In the image information conversion apparatus 50 according to the third embodiment of the present invention, as described above, it is possible to reduce the code size (bit rate) by treating the data in each block in the frequency domain, and thus the amount of calculation becomes small compared with that required by the conventional image information conversion apparatus in which image information is decoded into baseband video data and then coded again. Therefore, it is possible to construct the image information conversion apparatus 50 into a very simple form. Furthermore, the image information conversion apparatus 50 is capable of reduce the code size without generating degradation in image quality caused by the accumulation of motion compensation errors. Because the motion compensation error corrector 51 does not generate motion compensation error correction coefficients for high-frequency components in the horizontal direction, a further reduction in the amount of calculation is achieved.

As for processing upon the components in the vertical direction, he 4×8 inverse DCT converter 52 and the 4×8 DCT converter 56 perform 8th order inverse discrete cosine transform and the 8th order discrete cosine transform in a normal fashion. Herein, a fast algorithm may be applied to the processes performed by the 4×8 inverse DCT converter 52 and the 4×8 DCT converter 56.

Figure 36:
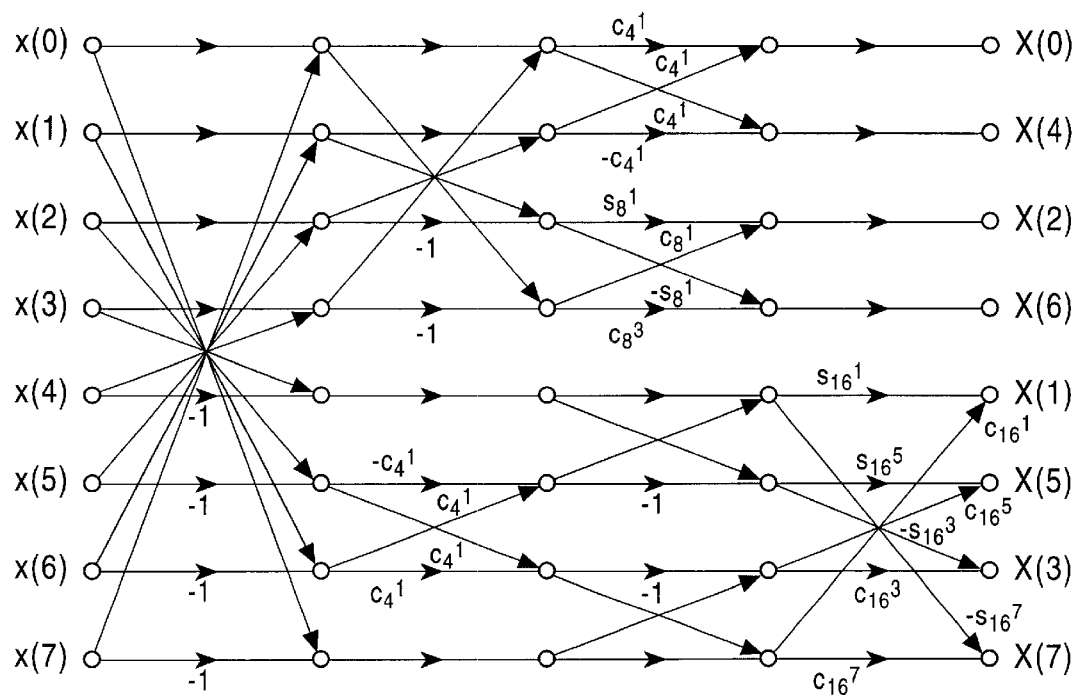
FIG. 36 is a flow chart illustrating a 4×8 discrete cosine transform and a 4×8 inverse discrete cosine transform according to a fast algorithm.

FIG. 36 is a flow chart illustrating the process according to the fast algorithm disclosed in a paper entitled "A fast computational algorithm for the discrete cosine transform" (IEEE Trans. Commun. Vol. 25, No. 9, pp. 1004–1009, 1977).

In this method, the discrete cosine transform is executed by performing the process in the direction (from variables x(0), . . . , x(7) to X(0), . . . , X(7)) denoted by arrows in FIG. 36. If the process is performed in the direction (from variables X(0), . . . , X(7) to x(0), . . . , x(7)) opposite to the direction denoted by the arrows in FIG. 36, the inverse cosine transform is executed. In FIG. 36, $C_l^i$ denotes cos (i$\pi$/l).

As for processing upon components in the horizontal direction, the 4×8 inverse DCT converter 52 and the 4×8 DCT converter 56 may perform the process according to either one of the following two methods.

Figure 37:
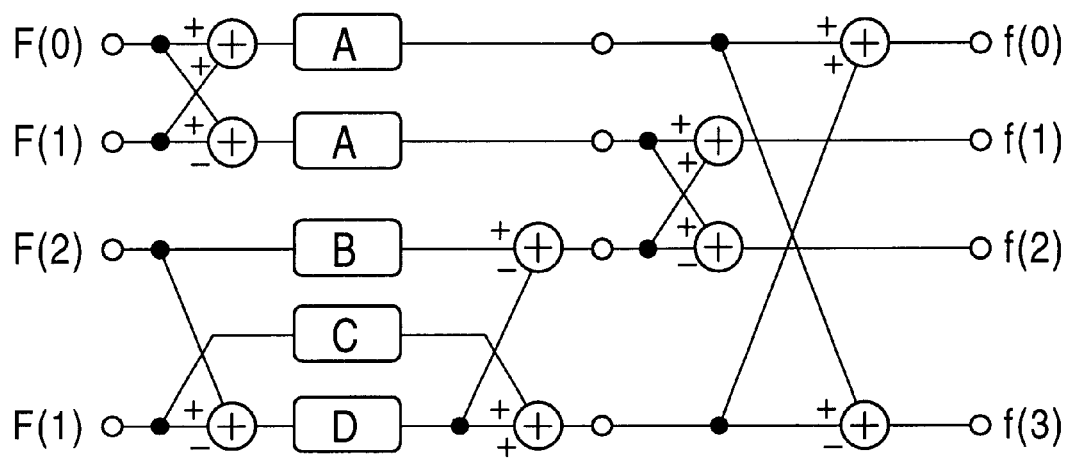
FIG. 37 is a flow chart illustrating a 4×8 discrete cosine transform and a 4×8 inverse discrete cosine transform according to another fast algorithm.
Figure 41:
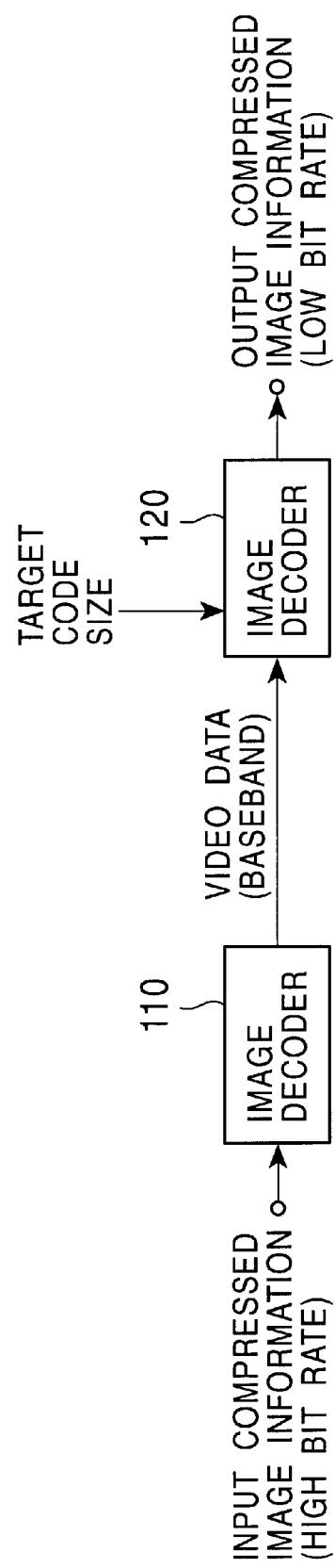
FIG. 41 is a block diagram illustrating a conventional image information conversion apparatus.

In the first method, the 4×8 inverse DCT converter 52 performs the 4th order inverse discrete cosine transform upon only low-frequency 4 coefficients of the frequency-domain quantization error coefficients associated with the 8th order discrete cosine transform coefficients. On the other hand, the 4×8 DCT converter 56 performs the 4th order discrete cosine transform in the horizontal direction upon the 4×8 space-domain motion compensation error correction values generated by means of motion compensation. Thus, 4×8 motion compensation error correction coefficients in the frequency domain are output. Herein, the 4th order inverse discrete cosine transform and the 4th order discrete cosine transform may be performed according to a fast algorithm. FIG. 37 is a flow chart illustrating an example of a process according to the 4th order fast algorithm. In this 4th order fast algorithm, if input is given by F(0), . . . , F(3) and result is output as f(0), . . . , f(3), the inverse discrete cosine transform is executed. Conversely, if input is by f(0), . . . , f(3) and result is output as F(0), . . . , F(3), the discrete cosine transform is executed.

In the second method, the 4×8 inverse DCT converter 52 first replaces high-frequency 4 coefficients of the frequency-domain quantization error coefficients associated with the 8th order discrete cosine transform coefficients with 0 and then performs the 8th order inverse discrete cosine transform upon the result thereby obtaining 8th order quantization error values in the space domain. Thereafter, the 4×8 inverse DCT converter 52 performs an averaging process or a skipping process upon the 8th order quantization error values in the space domain thereby generating the 4th order quantization error values in the space domain. On the other hand, the 4×8 DCT converter 56 converts, by means of interpolation, 4 space-domain motion compensation error correction values to 8 space-domain motion compensation error correction values. Thereafter, the 4×8 DCT converter 56 performs the discrete cosine transform upon the obtained 8 space-domain motion compensation error correction values and extracts 4 low-frequency components from the result. Thus, 4×8 motion compensation error correction coefficients in the frequency domain are output.

In the second method described above, the 4×8 inverse DCT converter 52 may perform the inverse discrete cosine transform and the averaging process, or the discrete cosine transform and the skipping process, in a single step using a single matrix. FIG. 38 illustrates an example of an equation (iD$_{4\_}$ave) which can be employed to perform the inverse discrete cosine transform and the averaging process using a single matrix. FIG. 39 illustrates an example of an equation (iD$_{4\_}$deci) which can be employed to perform the inverse discrete cosine transform and the skipping process using a single matrix.

Similarly, the 4×8 DCT converter 56 may perform the interpolation process and the discrete cosine transform in a single step using a single matrix. The equation (D$_{4\_}$ave) used to perform the interpolation process corresponding to the averaging process and the discrete cosine transform using a single matrix and the equation (D$_{4\_}$deci) used to perform the interpolation process corresponding to the skipping process and the discrete cosine transform using a single matrix are shown below.

$$D_{4\_deci} = {}^t(iD_{4\_deci})$$

$$D_{4\_ave} = {}^t(iD_{4\_ave})$$

where $^t(\ )$ denotes transpose of a matrix. Degradation in a color difference signal of a picture is less perceptible to human eyes than degradation in a luminance signal. Taking the above property into account, the 4×8 inverse DCT converter 52 may perform the inverse orthogonal transform after replacing high-frequency 4 coefficients of the discrete cosine transform coefficients of the color difference signal with 0. This allows a reductions in the amount of calculation.

In the above embodiment, the input image information is assumed to have been compressed according to the MPEG-2 standard. However, it is also possible to reduce the code size (bit rate) of image information (bit stream) coded by means of an orthogonal transform and motion compensation.

As described above, the present invention has great advantages. That is, in the method and apparatus for converting image information according to the present invention, orthogonal transform coefficients are first dequantized and then re-quantized using a different quantization step value. Because the image signal is processed in the frequency domain without being decoded into a baseband signal, it is possible to reduce the bit rate by performing a small amount of calculation using a simple circuit. Another advantage of the present invention is that the bit rate can be reduced without generating significant distortion or degradation in image quality caused by re-quantization.

In the method and apparatus for converting image information according to another aspect of the present invention, after limiting high-frequency components of the dequantized orthogonal transform coefficients, the orthogonal transform coefficients are re-quantized using a different quantization step value. This makes it possible to further reduce the bit rate without generating significant distortion or degradation in image quality caused by re-quantization. In the method and apparatus, information in the vertical direction, which included difference information between fields, is not limited thereby allowing the bit rate to be reduced without generating significant degradation in image quality.

In the method and apparatus for converting image information according to the present invention, the orthogonal transform coefficients may be dequantized and then re-quantized using a different quantization step value, and, furthermore, motion compensation may be performed upon the difference between the input orthogonal transform coefficients and the re-quantized orthogonal transform coefficients thereby correcting errors caused by motion compensation. This makes it possible to reduce the code size without generating degradation in image quality caused by accumulation of motion compensation errors due to re-quantization.

In the method and apparatus for converting image information according the present invention, after limiting high-frequency component values of the dequantized orthogonal transform coefficients in the horizontal direction, the re-quantization may be performed using a different quantization step value, and furthermore, motion compensation may be performed upon the differences in the low-frequency 4 coefficients in the vertical direction and 8 coefficients in the-vertical direction between the input orthogonal transform coefficients and the re-quantized orthogonal transform coefficients thereby correcting errors caused by motion compensation. This makes it possible to reduce the code size without generating degradation in image quality caused by accumulation of motion compensation errors due to re-quantization. Furthermore, a reduction in the circuit scale is achieved.

What is claimed is:

1. An image information conversion apparatus for converting first compressed image information with a first bit rate to second compressed image information with a second bit rate lower than said first bit rate, said first compressed image information having been produced by coding an image signal into a compressed form by means of performing an orthogonal transform on a block-by-block basis and then quantizing orthogonal coefficients, obtained by said orthogonal transform, within said block, each said block being a predetermined pixel block (orthogonal transform block), said image information conversion apparatus comprising:

dequantization means for dequantizing the orthogonal transform coefficients, in accordance with the quantization step value of the orthogonal transform coefficients of the input first compressed image information;

band limiting means for limiting high-frequency component values, in the horizontal direction, of the orthogonal transform coefficients dequantized by said dequantization means; and quantization means for re-quantizing the orthogonal transform coefficients dequantized by said dequantization means, using a quantization step value which is set so that the output second compressed image information has said second bit rate.

2. An image information conversion apparatus according to claim 1, wherein said band limiting means limits orthogonal coefficients for a color difference signal over a range whose lower limit is lower than for a luminance signal.

3. An image information conversion apparatus according to claim 1, further comprising:

compressed image information analysis means for analyzing the code size of each picture in the input first compressed image information; and code size control means for controlling the code size of the output second compressed image information, by controlling the quantization step value employed by said quantization means, wherein said code size control means determines the target code size (target bit rate) T of each picture of the second compressed image information in accordance with the following equation:

$$T=B(R2/R1)$$

where R1 is said first bit rate and R2 is said second bit rate.

4. An image information conversion apparatus according to claim 1, further comprising:

variable length decoding means for performing variable length decoding upon the input first compressed image information; and variable length coding means for performing variable length coding upon the compressed image information re-quantized by said quantization means, wherein said variable length coding means performs said variable length coding by scanning each orthogonal block in an alternate fashion thereby converting each orthogonal block into a one-dimensional signal.

5. An image information conversion apparatus for converting first compressed image information with a first bit rate to second compressed image information with a second bit rate lower than said first bit rate, said first compressed image information having been produced by coding an image signal into a compressed form by means of performing an orthogonal transform on a block-by-block basis and then quantizing orthogonal coefficients, obtained by said orthogonal transform, within said block, each said block being a predetermined pixel block (orthogonal transform block), said image information conversion apparatus comprising:

first dequantization means for dequantizing the orthogonal transform coefficients, in accordance with the quantization step value of the orthogonal transform coefficients of the input first compressed image information;

band limiting means for limiting high-frequency component values, in the horizontal direction, of the orthogonal transform coefficients dequantized by said first dequantization means;

addition means for adding motion compensation error correction coefficients to the orthogonal transform coefficients dequantized by said first dequantization means;

quantization means-for re-quantizing the orthogonal transform coefficients including motion compensation error correction coefficients added by said addition means, using a quantization step value which is set so that the output second compressed image information has said second bit rate;

second dequantization means for dequantizing the orthogonal transform coefficients re-quantized by said quantization means;

subtraction means for subtracting the orthogonal transform coefficients including motion compensation error correction coefficients added by said addition means from the orthogonal transform coefficients dequantized by said second dequantization means thereby generating quantization error coefficients in the frequency domain; and motion compensation error correction means for generating the motion compensation error correction coefficients by means of: performing an orthogonal transform upon the subtracted orthogonal transform coefficients and performing motion compensation in accordance with a motion vector; and performing an inverse orthogonal transform upon the motion-compensated values.

6. An image information conversion apparatus according to claim 5, wherein said band limiting means limits orthogonal coefficients for a color difference signal over a range whose lower limit is lower than for a luminance signal.

7. An image information conversion apparatus according to claim 5, wherein said motion n compensation error correction means does not perform the inverse orthogonal transform and the orthogonal transform upon orthogonal transform coefficients which have been converted to 0 by said band limiting means.

8. An image information conversion apparatus according to claim 5, further comprising:

compressed image information analysis means for analyzing the code size of each picture in the input first compressed image information; and code size control means for controlling the code size of the output second compressed image information, by controlling the quantization step value employed by said quantization means, wherein said code size control means determines the target code size (target bit rate) T of each picture of the second compressed image information in accordance with the following equation:

$T=B(R2/R1)$ where R1 is said first bit rate and R2 is said second bit rate.

9. An image information conversion apparatus according to claim 5, further comprising:

variable length decoding means for performing variable length decoding upon the input first compressed image information; and variable length coding means for performing variable length coding upon the compressed image information re-quantized by said quantization means, wherein said variable length coding means performs said variable length coding by scanning each orthogonal block in an alternate fashion regardless of the scanning method of the input first compressed image information, thereby converting each orthogonal block into a one-dimensional signal.

10. An image information conversion apparatus according to claim 5, wherein said motion compensation error correction means generates motion compensation error correction coefficients for P-pictures but does not generates motion compensation error correction coefficients for B-pictures.

11. An image information conversion apparatus according to claim 5, wherein said motion compensation error correction means performs the inverse orthogonal transform and the orthogonal transform in accordance with fast algorithm.

12. An image information conversion apparatus according to claim 5, wherein said orthogonal transform coefficients consist of 8 coefficients in the horizontal direction by 8 coefficients in the vertical direction, that is, 8×8 coefficients, and wherein said motion compensation error correction means comprises:

a 4×8 inverse orthogonal transformer for performing a 4×8 inverse orthogonal transform upon quantization error coefficients consisting of 8 coefficients in the horizontal direction by 8 coefficients in the vertical direction, thereby generating quantization error values in the space domain;

a motion compensator for performing motion compensation upon the space-domain quantization error values generated by said 4×8 inverse orthogonal transformer, with precision of ¼ pixels in the horizontal direction and ½ pixels in the vertical direction thereby generating quantization error correction values in the space domain; and a 4×8 orthogonal transformer for performing a 4×8 orthogonal transform upon the space-domain quantization error correction values generated by said motion compensator thereby generating said motion compensation error correction coefficients in the frequency domain.

13. An image information conversion apparatus according to claim 12, wherein said 4×8 inverse orthogonal transformer performs the inverse orthogonal transform after replacing high-frequency components of the orthogonal transform coefficients of a color difference signal in the vertical direction with 0.

14. An image information conversion apparatus according to claim 12, wherein:

said motion compensation error correction means includes an interpolator for interpolating, with precision of ¼ pixels in the horizontal direction, the space-domain quantization error values generated by said 4×8 inverse quantizer; and said motion compensator performs motion compensation in the horizontal direction using the interpolated values generated by said interpolator.

15. An image information conversion apparatus according to claim 12, wherein:

said 4×8 inverse orthogonal transformer performs a 4th order inverse orthogonal transform for only low-frequency 4 coefficients of 8th order quantization error coefficients in the frequency domain in the horizontal direction, and said 4×8 inverse orthogonal transformer performs an 8th order inverse orthogonal transform in the horizontal direction; and said 4×8 orthogonal transformer performs a 4th order orthogonal transform in the horizontal direction and an 8th order orthogonal transform in the vertical direction, upon the space-domain motion compensation error correction values.

16. An image information conversion apparatus according to claim 12, wherein:

said 4×8 inverse orthogonal transformer performs the inverse orthogonal transform in the horizontal direction in such a manner that an 8th order inverse orthogonal transform is performed after replacing, with 0, higher-frequency 4 coefficients of 8th order quantization error coefficients in the frequency domain in the horizontal direction, and then 4th order quantization error values in the space domain are generated by means of partial removal or by means of averaging; and said 4×8 orthogonal transformer performs the orthogonal transform in the horizontal direction in such a manner that a discrete cosine transform is performed after generating 8 motion compensation error correction values by interpolating 4 motion compensation error correction values in the space domain.

17. An image information conversion method for converting first compressed image information with a first bit rate to second compressed image information with a second bit rate lower than said first bit rate, said first compressed image information having been produced by coding an image signal into a compressed form by means of performing an orthogonal transform on a block-by-block basis and then quantizing orthogonal coefficients, obtained by said orthogonal transform, within said block, each said block being a predetermined pixel block (orthogonal transform block), said image information conversion method comprising the steps of:

inputting said first compressed image information with the first bit rate;

dequantizing the orthogonal transform coefficients, in accordance with the quantization step value of the orthogonal transform coefficients of the input first compressed image information;

limiting high-frequency component values, in the horizontal direction, of the orthogonal transform coefficients dequantized in said dequantization step;

re-quantizing the orthogonal transform coefficients dequantized in said dequantization step, using a quantization step value which is set so that the output second compressed image information has said second bit rate; and outputting the second compressed image information generated in said re-quantization step.

18. An image information conversion method for converting first compressed image information with a first bit rate to second compressed image information with a second bit rate lower than said first bit rate, said first compressed image information having been produced by coding an image signal into a compressed form by means of performing an orthogonal transform on a block-by-block basis and then quantizing orthogonal coefficients, obtained by said orthogonal transform, within said block, each said block being a predetermined pixel block (orthogonal transform block), said image information conversion method comprising the steps of:

inputting said first compressed image information with the first bit rate;

dequantizing the orthogonal transform coefficients, in accordance with the quantization step value of the orthogonal transform coefficients of the input first compressed image information;

limiting high-frequency component values, in the horizontal direction, of the orthogonal transform coefficients dequantized in said dequantization step;

adding motion compensation error correction coefficients to said orthogonal transform coefficients;

re-quantizing the orthogonal transform coefficients including motion compensation error correction coefficients added in said addition step, using a quantization step value which is set so that the output second compressed image information has said second bit rate;

outputting the second compressed image information generated in said re-quantization step;

generating the motion compensation error correction coefficients by: dequantizing said re-quantized orthogonal transform coefficients; subtracting the orthogonal transform coefficients including the added motion compensation correction coefficients from the dequantized orthogonal transform coefficients; performing an orthogonal transform upon the subtracted orthogonal transform coefficients and performing motion compensation in accordance with a motion vector; and performing an inverse orthogonal transform upon the motion-compensated values.

19. An image information conversion apparatus according to claim 18, wherein said orthogonal transform coefficients consist of 8 coefficients in the horizontal direction by 8 coefficients in the vertical direction, that is, 8×8 coefficients, and wherein said frequency-domain motion compensation error correction coefficients are generated by:

performing a 4×8 inverse orthogonal transform upon quantization error coefficients consisting of 8 coefficients in the horizontal direction by 8 coefficients in the vertical direction, thereby generating quantization error values in the space domain;

performing motion compensation upon said space-domain quantization error values, with precision of ¼ pixels in the horizontal direction and ½ pixels in the vertical direction thereby generating quantization error correction values in the space domain; and performing a 4×8 orthogonal transform upon said quantization error correction values in the space-domain.

* * * * *